(12) United States Patent
Deshpande

(10) Patent No.: US 10,341,733 B2
(45) Date of Patent: Jul. 2, 2019

(54) COMPANION DEVICE

(71) Applicant: Sharp Kabushiki Kaisha, Sakai, Osaka (JP)

(72) Inventor: Sachin G. Deshpande, Camas, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 15/311,892

(22) PCT Filed: May 21, 2015

(86) PCT No.: PCT/JP2015/002571
§ 371 (c)(1),
(2) Date: Nov. 17, 2016

(87) PCT Pub. No.: WO2015/182085
PCT Pub. Date: Dec. 3, 2015

(65) Prior Publication Data
US 2017/0085955 A1 Mar. 23, 2017

Related U.S. Application Data

(60) Provisional application No. 62/007,740, filed on Jun. 4, 2014, provisional application No. 62/003,410, filed on May 27, 2014.

(51) Int. Cl.
| H04N 21/4722 | (2011.01) |
| H04N 21/436 | (2011.01) |
| H04N 21/41 | (2011.01) |
| H04N 21/4363 | (2011.01) |
| H04N 21/482 | (2011.01) |
| H04N 21/488 | (2011.01) |

(Continued)

(52) U.S. Cl.
CPC ..... *H04N 21/4722* (2013.01); *H04N 21/4126* (2013.01); *H04N 21/41407* (2013.01); *H04N 21/436* (2013.01); *H04N 21/43637* (2013.01); *H04N 21/482* (2013.01); *H04N 21/4882* (2013.01); *H04N 21/6405* (2013.01); *H04N 21/8126* (2013.01)

(58) Field of Classification Search
CPC ............. H04N 21/4722; H04N 21/436; H04N 21/4126; H04N 21/43637; H04N 21/482; H04N 21/4882; H04N 21/41407; H04N 21/6405; H04N 21/8126
See application file for complete search history.

(56) References Cited

U.S. PATENT DOCUMENTS

2007/0067808 A1* 3/2007 DaCosta ............ H04N 7/17318
725/62
2012/0174155 A1 7/2012 Mowrey et al.
(Continued)

FOREIGN PATENT DOCUMENTS

| CN | 102300129 A | 12/2011 |
| CN | 103024457 A | 4/2013 |

OTHER PUBLICATIONS

U.S. Appl. No. 61/950,790, filed Mar. 10, 2014.*
(Continued)

*Primary Examiner* — Yassin Alata
(74) *Attorney, Agent, or Firm* — Keating & Bennett, LLP

(57) ABSTRACT

A system for generating, providing and/or receiving services for companion devices.

15 Claims, 20 Drawing Sheets

(51) Int. Cl.
    *H04N 21/414*     (2011.01)
    *H04N 21/6405*     (2011.01)
    *H04N 21/81*     (2011.01)

(56) References Cited

U.S. PATENT DOCUMENTS

2013/0179920 A1    7/2013  Esaka
2017/0105055 A1*    4/2017  Lee .................... H04N 21/8586

OTHER PUBLICATIONS

Oasis, "Common Alerting Protocol", Version 1.2, http://docs.oasis-open.org/emergency/cap/v1.2/CAP-v1.2-os.html, Jul. 1, 2010, 31 pages.
HbbTV Association, "HbbTV 2.0 Specification", Feb. 2, 2015, pp. 1-249.
Advanced Television Systems Committee, "ATSC Candidate Standard: Interactive Services Standard (A/105:2014)" Rev. 7, ATSC S13-2-389r7, Apr. 24, 2014, 139 pages.

* cited by examiner

COMPANION DEVICE

TECHNICAL FIELD

The present disclosure relates generally to companion devices also known as second screen devices and services.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio) may originate from a plurality of sources including, for example, over-the-air television providers, satellite television providers, cable television providers, online media services, including, so-called streaming services, and the like. Digital media content may be transmitted from a source (e.g., an over-the-air television provider) to a receiver device (e.g., a digital television) according to a transmission standard. Examples of transmission standards include Digital Video Broadcasting (DVB) standards, Hybrid Broadcast and Broadband Television (HbbTV) 2.0 standard, and standards developed by the Advanced Television Systems Committee (ATSC), including, for example, the ATSC 2.0 standard. The ATSC is currently developing the so-called ATSC 3.0 standard.

In addition to defining how digital media content may be transmitted from a source to a receiver device, transmission standards may define how data may be transmitted to support so-called second screen applications. Second screen applications may refer to applications operating on a device other than a primary receiver device. For example, it may be desirable for a tablet computer to run an application in conjunction with the media playback on the primary media rendering device, where the application enables an enhanced viewing experience. Current techniques for enabling second screen applications may be less than ideal.

A video service is capable of sending audiovisual content to a receiving device. The receiving audiovisual device typically presents the content to the viewer, such as on a television device. In some cases, the viewer would like to use their mobile device, such as a mobile phone, to interact with the video content. However, how to most effectively interact with the audiovisual content on the receiving device using the mobile phone tends to be problematic due to synchronization issues. In one case the viewer may want to receive audiovisual content on a receiver such as a television device. At the same time the user may want to receive adjunct associated content on a second screen, e.g. a mobile device such as a smartphone or a tablet. The content received on the second screen device may be same as or alternate content associated with the audiovisual content being received on the television. The user may typically like these two contents be presented on the primary and second screen device in a synchronized manner.

As described above, transmission standards may define how data may be provided to a companion device to support second screen applications. ATSC Candidate Standard: Interactive Services Standard (A/105:2014), S13-2-389r7, 12 Dec. 2013, Rev. 7, 24 Apr. 2014 (hereinafter "ATSC 2.0 A105"), specifies services that can be provided by a device configured to receive an ATSC 2.0 transport stream to support the display of content related to an A/V broadcast by applications running on second screen devices. According to ATSC 2.0 A105, an ATSC 2.0 receiver may support the following services for the use by a second screen application: trigger delivery service, two-way communications service, and optionally HTTP proxy server service. In ATSC 2.0 A105, trigger delivery service is limited to an ATSC 2.0 receiver simply passing triggers including limited information to a second screen device. The amount of information that may be included in a trigger is limited. Further, in ATSC 2.0 A105, two-way communications service simply provides a TCP/IP connection for a primary device and a second screen device to communicate. That is, each of the primary device and the second screen device must be configured to transmit and receive data according to a proprietary format. This typically results in devices that have different manufacturers being incompatible. In ATSC 2.0 A105, HTTP proxy server service simply provides a mechanism for a primary device to act as a proxy for a second screen device, e.g., when a second screen device has limited Internet connectivity. Thus, each of the services for supporting second screen applications in ATSC 2.0 A105 are limited and do not provide content information to an application running on a companion device in an efficient manner. ATSC 2.0 A105 does not define actual message content, message formats and various types of message exchanged between a primary device and a companion device. In contrast this disclosure describes this type of information.

As described above, transmission standards may define how data may be provided to a companion device to support second screen applications. Hybrid Broadcast and Broadband Television (HbbTV) 2.0 standard: (HbbTV_specification_2_0:2015), (hereinafter "HbbTV 2.0"), specifies services to support companion screens. The methods to allow for interaction between HbbTV and Companion Screens are described in HbbTV 2.0. Whilst primarily targeted at iOS and Android devices, the framework described in HbbTV 2.0 should allow Companion Screens of any type to be used. The HbbTV terminal and the Companion Screens have to be connected to the same local network, and the local network should be connected to the Internet. Following features are supported by HbbTV 2.0:

- An HbbTV application launching a Companion Screen application
- The Companion Screen application may be an HTML application running in a browser on the Companion Screen, or may be a native Companion Screen application. There is also the facility for the HbbTV application to direct the user to the location of a native application in a Companion Screen's 'store' (so that application can be downloaded) if it isn't already installed on the user's Companion Screen device.
- A Companion Screen application launching a broadcast independent HbbTV application on an HbbTV terminal.
- To allow an HbbTV application and a Companion Screen application to communicate directly by establishing a communication channel onto which text or binary messages can be exchanged, regardless of the launch methods of either the HbbTV application or the Companion Screen application.
- To enable a companion screen or another HbbTV terminal to locate the services, provided by the HbbTV terminal.

HbbTV 2.0 does not define actual message content, message formats and various types of message exchanged between a primary device and a companion device. In contrast this disclosure describes this type of information.

Additionally in the prior art The Common Alerting Protocol (CAP) (http://docs.oasis-open.org/emergency/cap/v1.2/CAP-v1.2-os.html) provides an open, non-proprietary digital message format for all types of alerts and notifications. It does not address any particular application or telecommunications method. The CAP format is compatible with emerging techniques, such as Web services, as well as existing formats including the Specific Area Message Encoding (SAME) used for the United States' National Oceanic and Atmospheric Administration (NOAA) Weather Radio and the Emergency Alert System (EAS), while offering enhanced capabilities. CAP includes:

Flexible geographic targeting using latitude/longitude shapes and other geospatial representations in three dimensions;
Multilingual and multi-audience messaging;
Phased and delayed effective times and expirations;
Enhanced message update and cancellation features;
Template support for framing complete and effective warning messages;
Compatible with digital signature capability; and,
Facility for digital images and audio.

Key benefits of CAP may include reduction of costs and operational complexity by eliminating the need for multiple custom software interfaces to the many warning sources and dissemination systems involved in all-hazard warning. The CAP message format can be converted to and from the "native" formats of different kinds of sensor and alerting technologies, forming a basis for a technology-independent national and international "warning internet." Where as CAP message format provides a general framework it may be too complex for emergency alert message communication between a primary device and a companion device The proposed protocol in this disclosure related to emergency alert information exchange between a primary device and companion device is lightweight and efficient.

The foregoing and other objectives, features, and advantages of the invention will be more readily understood upon consideration of the following detailed description of the invention, taken in conjunction with the accompanying drawings.

SUMMARY OF INVENTION

One embodiment of the present invention discloses A method for a companion device to receive current service information from a primary device comprising: (a) said companion device requesting said current service information from said primary device; (b) said requesting by said companion device comprising input parameters including at least one of: (i) a companion device ID; (ii) a companion device application ID; (iii) a companion device application version; (c) said requesting by said companion device comprising current information requested including at least one of: (i) request electronic service guide information for a current show; (ii) request for current available components for said current show; (iii) request for current available files for said current show; (iv) request for current available non real-time content for said current show; (d) said requesting by said companion device comprising a request for filtering criterion; (b) said companion device receiving from said primary device in response to said requesting said current service information a current service information response; (f) said receiving said current service information response including a primary device ID; (g) said receiving said current service information response including at least one of: (i) said electronic service guide information for said current show; (ii) said current available components for said current show; (iii) said current available files for said current show; (iv) said current available non real-time content for said current show.

Another embodiment of the present invention discloses a companion device that receives current service information from a primary device comprising: (a) said companion device requesting said current service information from said primary device; (i) input parameters including at least one of: (a) a companion device ID; (b) a companion device application ID; (c) a companion device application version; (ii) current information requested including at least one of: (a) request electronic service guide information for a current show; (b) request for current available components for said current show; (c) request for current available files for said current show; (d) request for current available non real-time content for said current show; (iii) a request for filtering criterion; (e) said companion device receiving from said primary device in response to said requesting said current service information a current service information response; (i) a primary device ID; and (ii) at least one of: (a) said electronic service guide information for said current show; (b) said current available components for said current show; (c) said current available files for said current show; (d) said current available non real-time content for said current show.

Another embodiment of the present invention discloses a method for a primary device to provide current service information to a companion device comprising: (a) said primary device providing said current service information to said companion device; (b) said providing to said companion device in response to a request from said companion device comprising input parameters including at least one of: (i) a companion device ID; (ii) a companion device application ID; (iii) a companion device application version; (c) said providing to said companion device in response to a request from said companion device comprising current information requested including at least one of: (i) request electronic service guide information for a current show; (ii) request for current available components for said current show; (iii) request for current available files for said current show; (iv) request for current available non real-time content for said current show; (d) said providing to said companion device in response to a request from said companion device comprising a request for filtering criterion; (e) said primary device providing a current service information response to said companion device in response to said request of said current service information; (f) said providing said current service information response including a primary device ID; (g) said providing said current service information response including at least one of: (i) said electronic service guide information for said current show; (ii) said current available components for said current show; (iii) said current available files for said current show; (iv) said current available non real-time content for said current show.

Another embodiment of the present invention discloses a primary device to provide current service information to a companion device comprising: (a) said primary device providing said current service information to said companion device in response to a request from said companion device comprising; (i) input parameters including at least one of: (a) a companion device ID; (b) a companion device application ID; (c) a companion device application version; (ii) current information requested including at least one of: (a) request electronic service guide information for a current show; (b) request for current available components for said current show; (c) request for current available files for said current show; (d) request for current available non real-time content for said current show; (iii) a request for filtering criterion; (b) said primary device providing a current service information response to said companion device in response to said request of said current service information including; (i) a primary device ID; (ii) at least one of: (a) said electronic service guide information for said current show; (b) said current available components for said current show; (c) said current available files for said current show; (d) said current available non real-time content for said current show.

DESCRIPTION OF EMBODIMENTS

Figure 1:
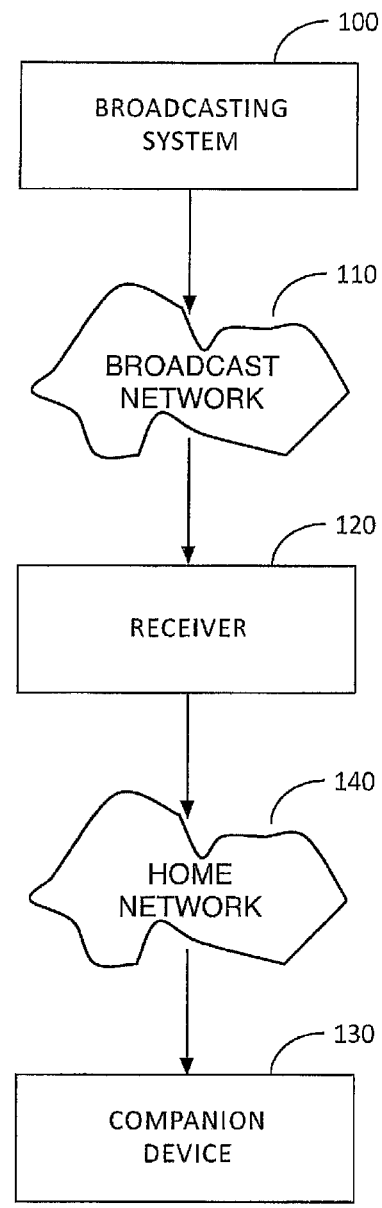
FIG. 1 illustrates a video system.

Referring to FIG. 1, a logical architecture of an audiovisual system is illustrated. The system includes a broadcasting system 100 that provides a source of audiovisual (video and/or audio and/or closed caption) content. The audiovisual content may be provided in any suitable manner and using suitable standards, such as for example, MPEG-2 (ISO/IEC 13818), MPEG-4 (ISO/IEC 14496) or ATSC (A/53E). By way of example, the broadcasting system may be provided from a broadcasting antenna, a cable, a network based audiovisual source, a compact disk, a hard drive, a digital video disc, and/or an Internet based audiovisual source. The broadcasting system 100 may provide the content through any suitable broadcast network 110. A receiver 120 receives the audiovisual content together with any other data provided with the audiovisual content, such as digital data, data services, or otherwise. The receiver 120, generally referred to as a primary device, is preferably configured to receive the type of content being provided there to. The receiver may be, for example, a television, a laptop, a tablet, a phone, a device with a tuner, a connected device, or any other device suitable to present the audiovisual content to a viewer. The receiver may be typically in a user's home. The receiver may likewise communicate with another display device 130, generally referred to as a companion device, through a home network 140. In another embodiment the companion device may communicate directly with an outside server to receive audiovisual and/or adjunct content. The home network is preferably a wireless or wired type network, such as for example, Wi-Fi, Ethernet, 3GPP, Bluetooth, infra-red, HTTP. In some cases the home network may be a local area network. In some cases the primary and companion devices may be inside a user's home. In other cases, the home network may be an office environment. The companion device may include, for example, a mobile phone, a mobile tablet, a laptop, a computer, or other display device. In addition, the receiver may simultaneously communicate with a plurality of companion devices 130. Additionally one companion device may communicate simultaneously with multiple primary devices 120. In some embodiments the primary device may be called a first screen device. In some embodiments the companion device may be called a second screen device. The terms primary device and first screen device and receiver may be used interchangeably. The terms second companion device and second screen device may be used interchangeably.

Figure 2:
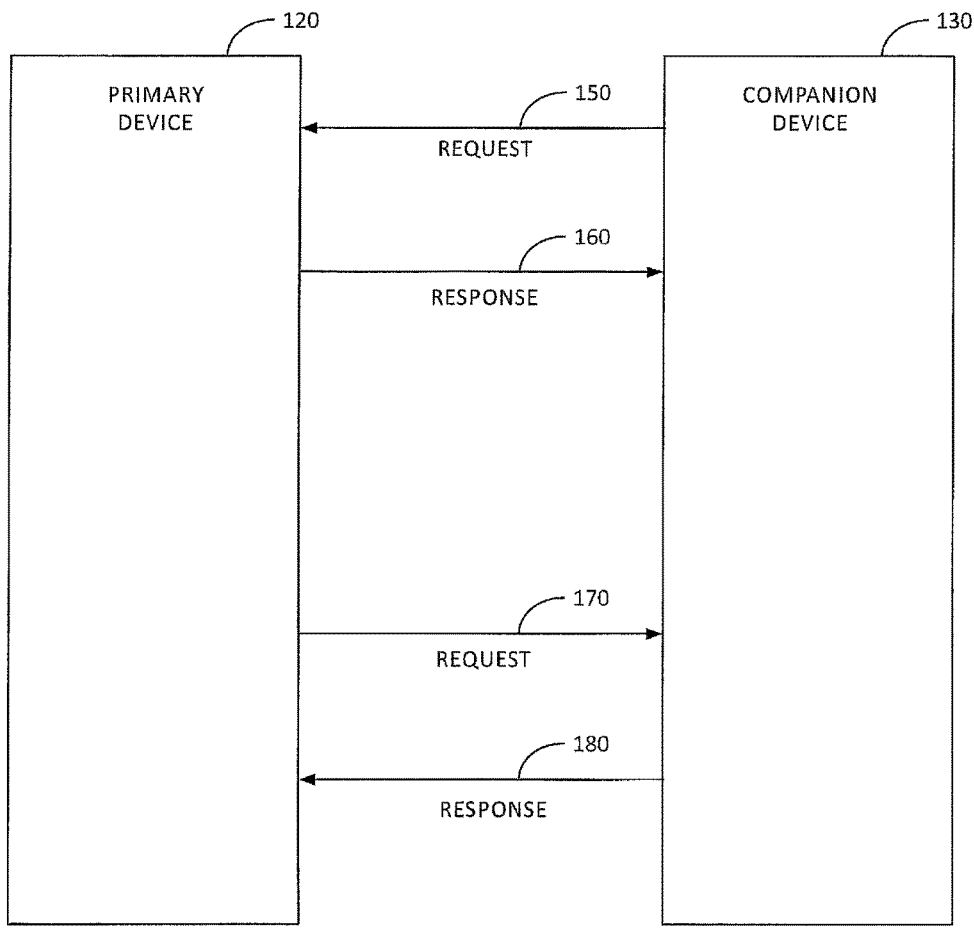
FIG. 2 illustrates a primary device and a companion device system.

Referring to FIG. 2, it is often desirable that the primary device 120 is capable of providing information to the companion device 130. In addition, the companion device 130 may provide information to the primary device 120. Often, the companion device 130 makes a request 150 to the primary device 120, which in response thereto provides a response 160 to the companion device 130. In other cases, the primary device 120 makes a request 170 to the companion device 130, which in response thereto provides a response 180 to the primary device 120. This permits the primary device 120 to display content thereon, and the companion device 130 may likewise interact with the primary device 120. For example, it may be desirable that whatever is being presented on the primary device 120 is simultaneously being presented on the companion device 130, which may include for example, audio and/or video content. For example, it may be desirable to present a primary view of the video content on the primary device 120 and simultaneously present an alternative view of the same or similar scene of the video content on the companion device 130. For example, it may be desirable to present audiovisual content on the primary device 120 and simultaneously interact with an associated application that is started (or automatically started) on the companion device 130. In this case typically the content being presented on the primary device and the companion device should be synchronized. The synchronization refers to displaying the data corresponding to the same or approximately same time instance on the primary and the companion device.

Figure 3:
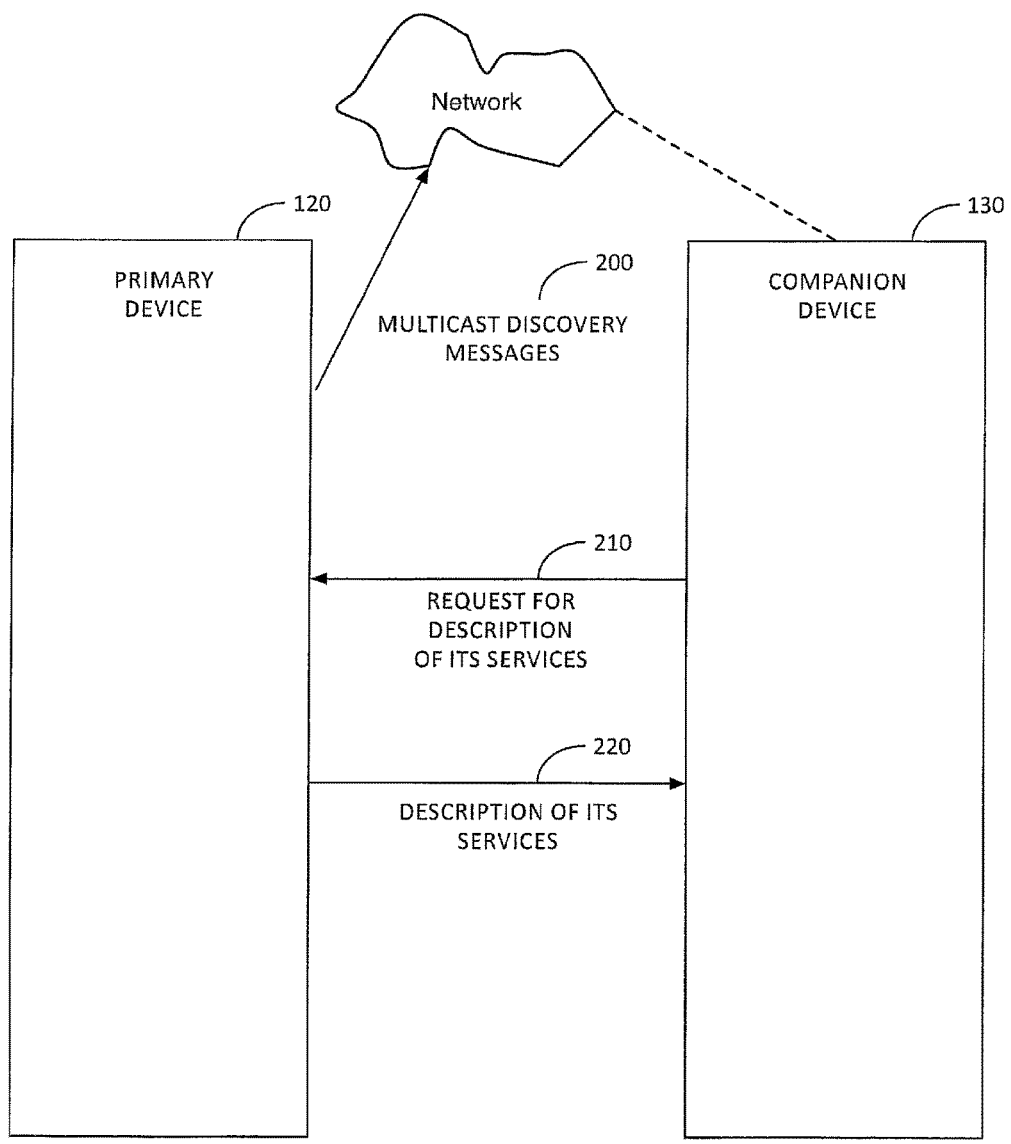
FIG. 3 illustrates another primary device and a companion device system.

Referring to FIG. 3, by way of example, the user may have an ATSC compliant companion device 130 with an ATSC compliant application running thereon when an ATSC primary device 120 (e.g., a television) joins the network. This may occur, for example, when the receiver is turned on or its network interface is enabled. The ATSC primary device 120 may be capable of providing services for the companion device 130. The ATSC primary device 120 may multicast its discovery messages 200 to advertise its ATSC second screen support services. The ATSC compliant companion device 130 receives the multicast discovery messages and sends the ATSC primary device 120 a request for descriptions of its services 210. The ATSC primary device 120 responds to this request with a description of its services 220. The ATSC compliant companion device 130 uses the information provided in the descriptions to access the appropriate services and provide an interactive experience synchronized with the programming, or program being shown, on the primary device 120.

Figure 4:
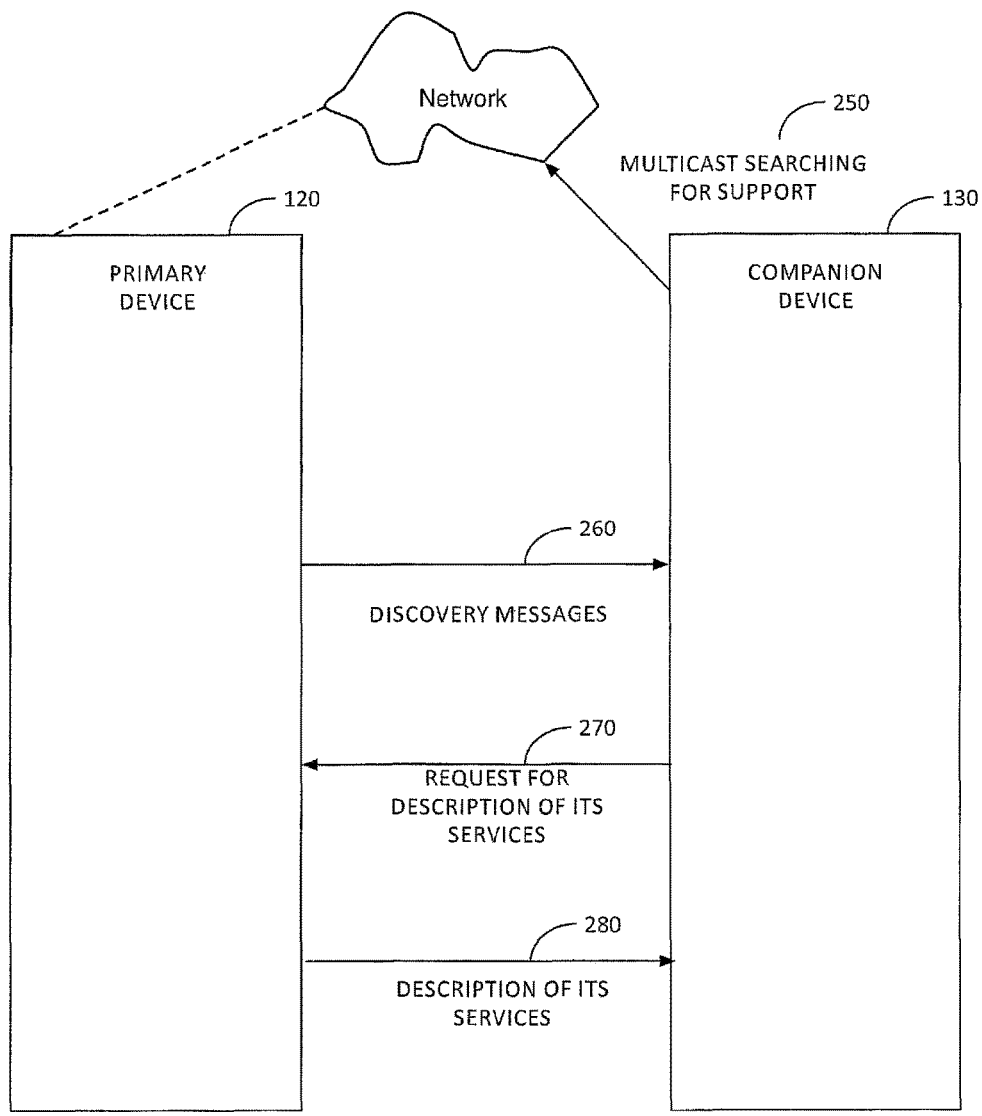
FIG. 4 illustrates another primary device and a companion device system.

Referring to FIG. 4, by way of example, the user may not have an ATSC compliant companion device 130 with an ATSC compliant application running thereon when the ATSC primary device 120 (e.g., television) joins the network. The audiovisual content being viewed on the ATSC compliant primary device 120 may enter a program segment that offers companion device 130 support. This may occur, for example, when the receiver is turned on or its network interface is enabled, or when a channel change goes from a channel that does not offer the companion device 130 with another that does offer support for the companion device 130, or when the channel being viewed goes from a program segment that does not offer support for the companion device 130 to a segment that does offer support for the companion device 130. This viewing change causes the ATSC primary device 120 to inform the viewer in some manner that companion device 130 support is available. For example, a small icon may be presented in the corner of the primary device 120. If the viewer decides to take advantage of the second screen support and activate an ATSC compliant application on the companion device 130, then the companion device 130 may multicast a message 250 searching for devices that offer ATSC companion device 130 support or service. The ATSC primary device 120 may respond to this message with its discovery messages 260. When the companion device 130 receives the discovery messages, it sends the ATSC primary device 120 receiver a request for descriptions of its services 270. The ATSC primary device 120 responds with description of its services 280. The companion device 130 uses the information given in the descriptions to access the appropriate services and provide an interactive experience synchronized with the audiovisual content.

Figure 5:
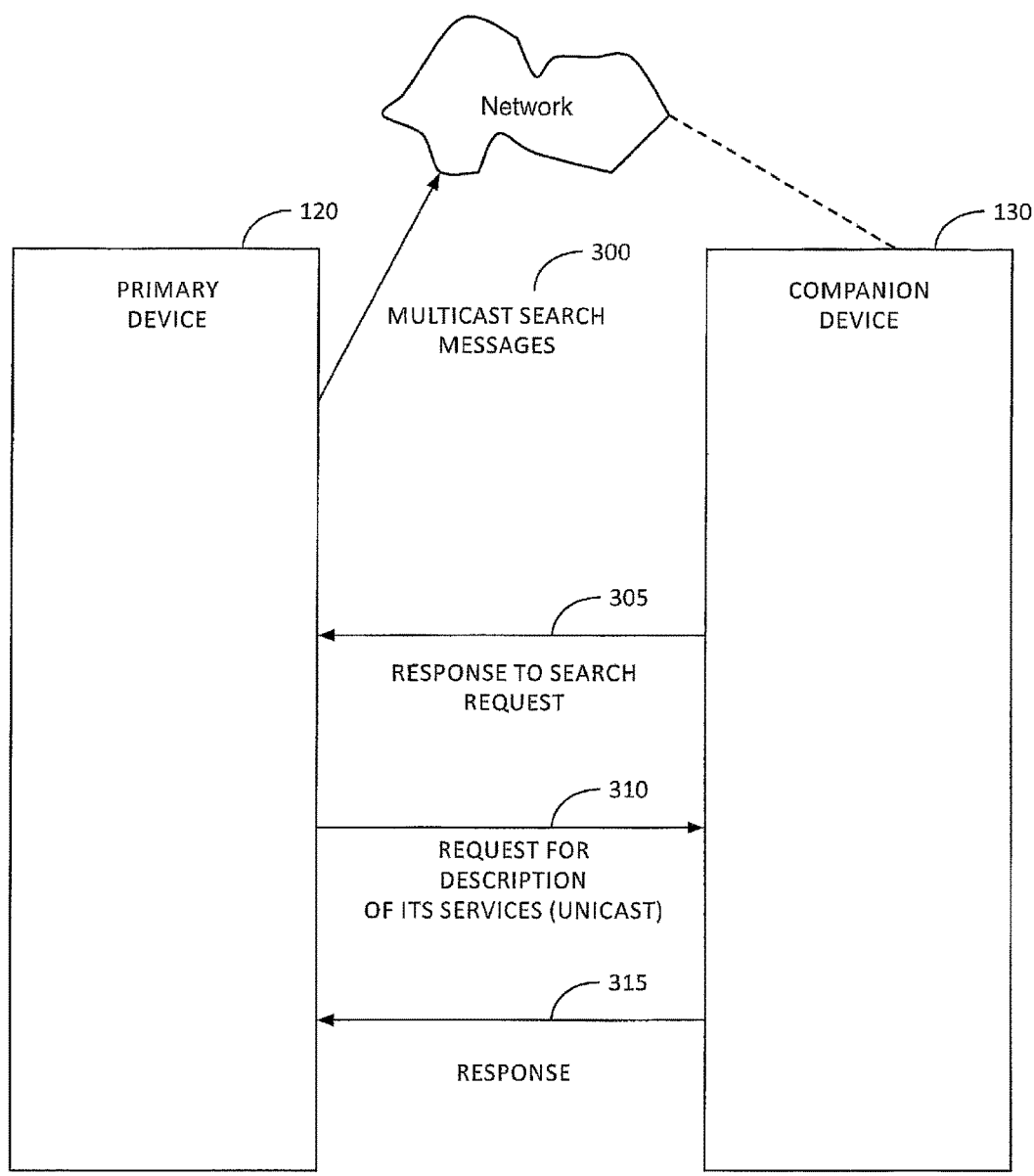
FIG. 5 illustrates another primary device and a companion device system.

Referring to FIG. 5, by way of example, the viewer has an ATSC compliant companion device application running when the ATSC primary device joins the network (e.g., when the primary device is turned on or the network interface is enabled). The primary device 120 desires to discover one or more companion devices 130 on the network. The primary device 120 joins the network and multicasts it search messages 300 seeking companion devices 130. The companion device 130 running an ATSC application receives the multicast search message and in response sends the primary device 120 a response indicating its presence 305. On receiving this response the primary device 120 may send a request 310 for the description of services that companion device offers to primary device. The message 310 may be sent via a unicast technique, rather than a multicast technique. On receiving the message 310 the companion device responds with a description of its services by sending a message 315 to the primary device. The primary device 120 receives the message 315 and uses the information given in the service descriptions to access the appropriate services and to understand the capabilities of the companion device 130. The capabilities of the companion device may include but not be limited to a device resolution, network speed, processor speed, type, presence of sensors, or other characteristics of the device.

Figure 6:
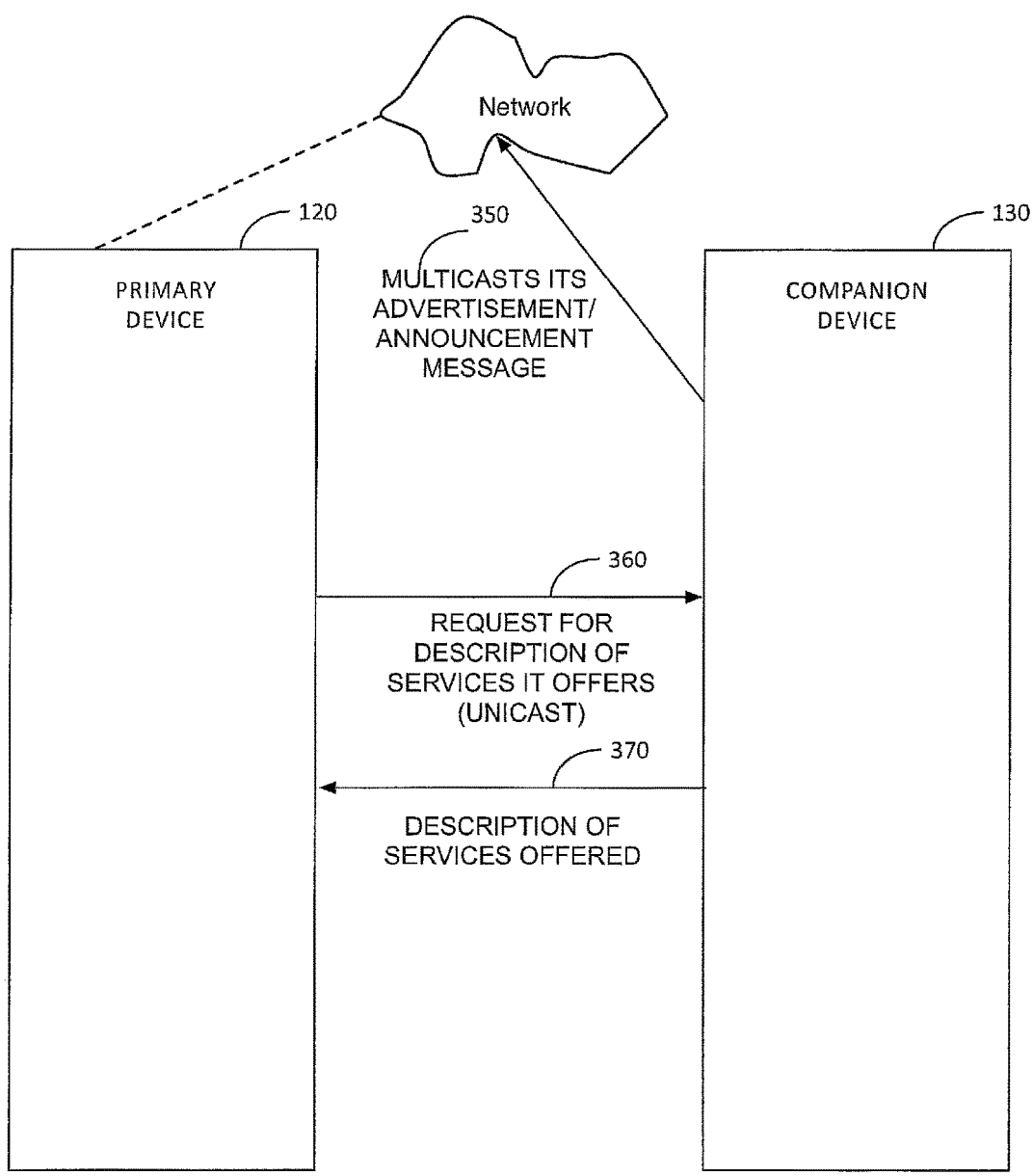
FIG. 6 illustrates another primary device and a companion device system.

Referring to FIG. 6, by way of example, a new ATSC companion device 130 joins the network or an ATSC application is started on a companion device 130. The primary device 120 is already on the network. The companion device 130 multicasts its advertisement/announcement message 350 that announces the companion device 130 and its available services. The primary device 120 receives the multicast advertisement message from the companion device 130 via network and sends the companion device 130 a request for descriptions of the services it offers 360. The message may be sent via unicast, rather than multicast. The companion device receives the message and responds with a description of the services it offers 370 to the primary device 120. The primary device 120 uses the information given in the service descriptions to access the appropriate services and to understand the capabilities of the companion device.

As illustrated in FIGS. 3-6, the household may have more than one companion device on the home network and the household may have more than one primary device on the network. In this case each ATSC companion device would receive lookup messages from multiple different primary devices via network. Also multiple primary devices will receive announcement messages from multiple companion devices via network.

As noted above, in some environments, there may be more than one primary device 120, especially when using the home network. In this case, the companion device 130 may receive discovery messages from the multiple primary devices 120 via network. If that happens the companion device 130 may ask the user which of the primary devices 120 to interact with.

A typical application on the companion device 130 may operate as follows. A control point or service on the companion device 130 subscribes to a packaged apps service on the primary device 120. A packaged app may be an application on the device offering service. A viewer starts the packaged app on the primary device 120 The packaged app makes the name of application on the companion device 130 and the URL, or uniform resource locator, of the application on the companion device 130 available to the packaged app service. The control point on the companion device 130 receives the companion application name and URL. The control point sets a marker on the companion device 130 indicating that viewer action is needed. The viewer reviews the companion application name and selects it. The control point launches the indicated application on the companion device 130 as indicated by ATSC Candidate Standard: Interactive Services Standard (A/105:2014), Apr. 24, 2014 (513-2-389r7), incorporated by reference herein in its entirety.

Figure 7:
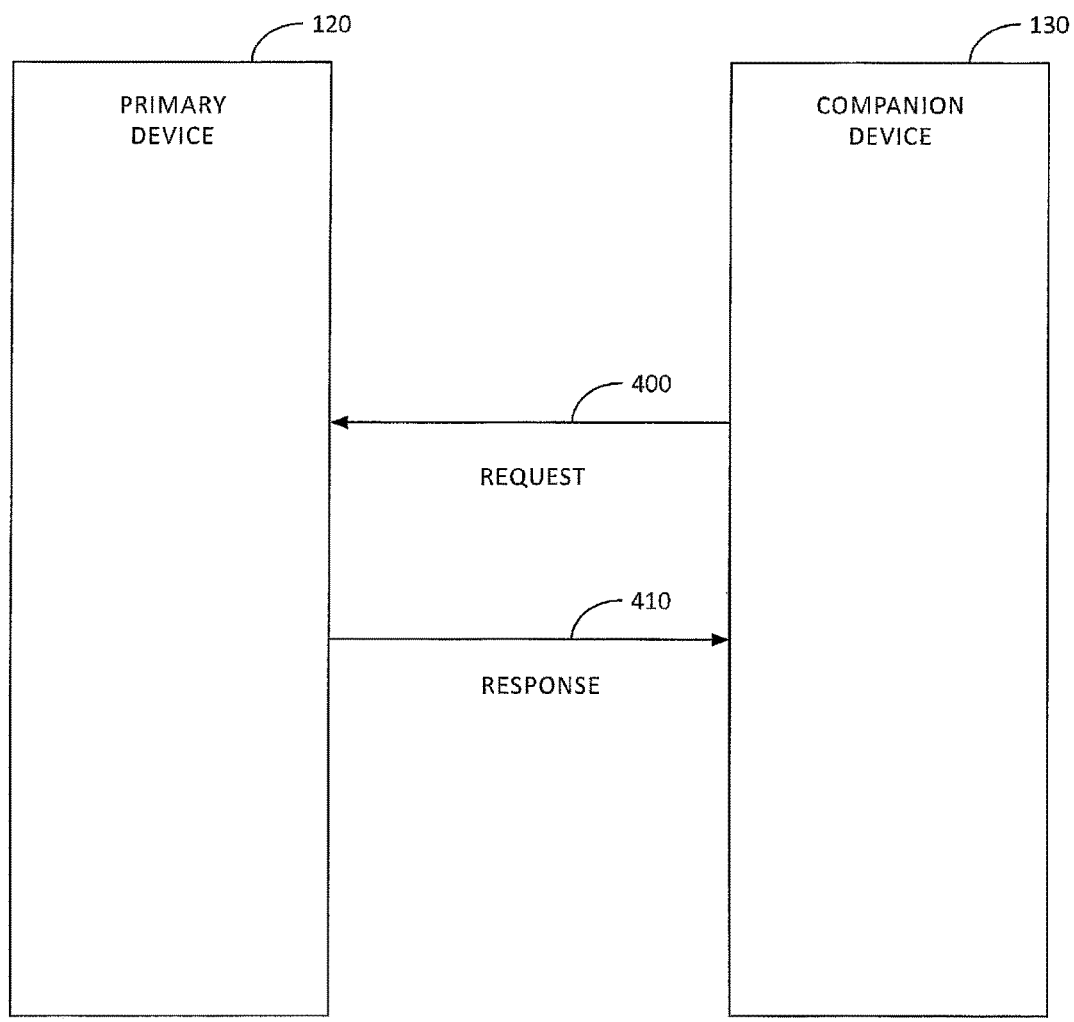
FIG. 7 illustrates another primary device and a companion device system.
Figure 7A:
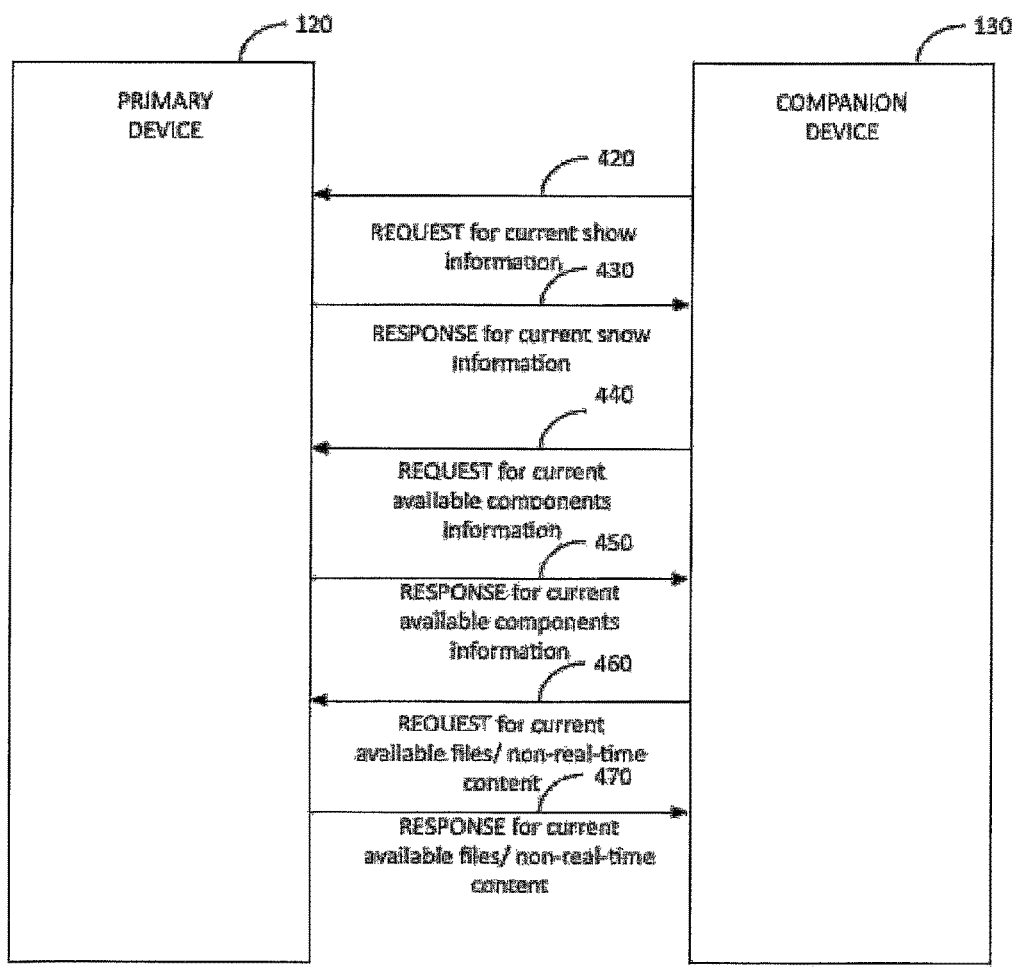
FIG. 7A illustrates another primary device and a companion device system.

Referring to FIG. 7 and FIG. 7A, it is desirable for the companion device 130 to request information from the primary device 120 about the current audiovisual content being presented on the primary device. While the companion device 130 may make a request to subscribe to the receive the information about content being presented the primary device 120 which provides a response with an ID for the content, and then make a request for the content based upon the ID, this is a cumbersome process. In addition, in the event that the content being displayed on the primary device 120 changes, then the ID provided to the companion device 130 that was previously received will refer to different content than that currently being presented on the primary device causing a disrupted experience for the viewer using the companion device 130. To alleviate the concern about receiving a response that does not correspond to the currently displayed audiovisual content, the companion device 130 preferably makes a single request 400 to the primary device 120 for information about the currently running service, program and/or show, and/or segment without having to provide an identification of the currently running service, show, and/or segment. The primary device 120, in response to receiving the request 400, provides a response 410 with the desirable information. The desirable information may include, for example, an electronic service guide type information about the content currently being presented on the primary device For example the companion device 130 may make a request to the primary device 120 to receive current service information. This may be as shown in FIG. 7 and FIG. 7A. This may be invoked at any time when the input parameters for this request may include one or more of the following:

Companion Device ID
Companion Device Application ID
Companion Device Application Version
Current information requested may include one or more of following:
Request for current show information (e.g., electronic service guide information for the current show being presented on the primary device), 420;
Request for currently available components for the current show being presented on the primary device (e.g., video, audio, closed captioning, main camera view, alternative camera view, etc. for the content being presented on the primary device), 440;
Request for currently available files and/or non-real-time content for the current show being presented on the primary device, 460;
Optionally the request may include a filtering criterion which may be used to limit the amount of information being requested in response thereto.
An example of the filtering criterion may be e.g., standard definition video only, high definition video or ultra-high definition video, black/white video, color video, 5.1 channel audio, or stereo audio etc.
For example the primary device 120 may send a response to the companion device 130 after receiving the above request. This may preferably be sent upon receiving a service information request. The response parameters 410 may include one or more of the following:
Primary device ID
Requested information in the response about the current show may include one or more of following:
Current show information (e.g., electronic service guide), 430;
Information about ccurrently available components for the current show (e.g., video, audio, closed captioning, main camera view, alternative camera view), 450;
Currently available files and/or non-real-time content for the current show, 470.

Referring to FIG. 7 and FIG. 7A in addition to or instead of obtaining information about current show, the companion device 130 can obtain information from the primary device 120 about a future and/or past show. As such a general request can be sent from the companion device 130 to the primary device 120 to obtain Electronic service guide (ESG) information. Then the primary device 120 my send a response to the companion device 130 including the requested Electronic service guide (ESG) information. The request response transaction may be as described below.

Request 400 from the companion device 130 to primary device for service guide information (may be sent any time) and may include one or more of the following:
Companion Device ID
Companion Device Application ID
Companion Device Application Version
Service/content/component identifier with special value for indicating receiving service guide information
Response 410 from the primary device 120 to the companion device for the service guide information may be sent upon receiving the request 400 and may include one or more of the following
Primary device ID
Service guide fragment data requested or the full service guide data if requested.

Figure 8:
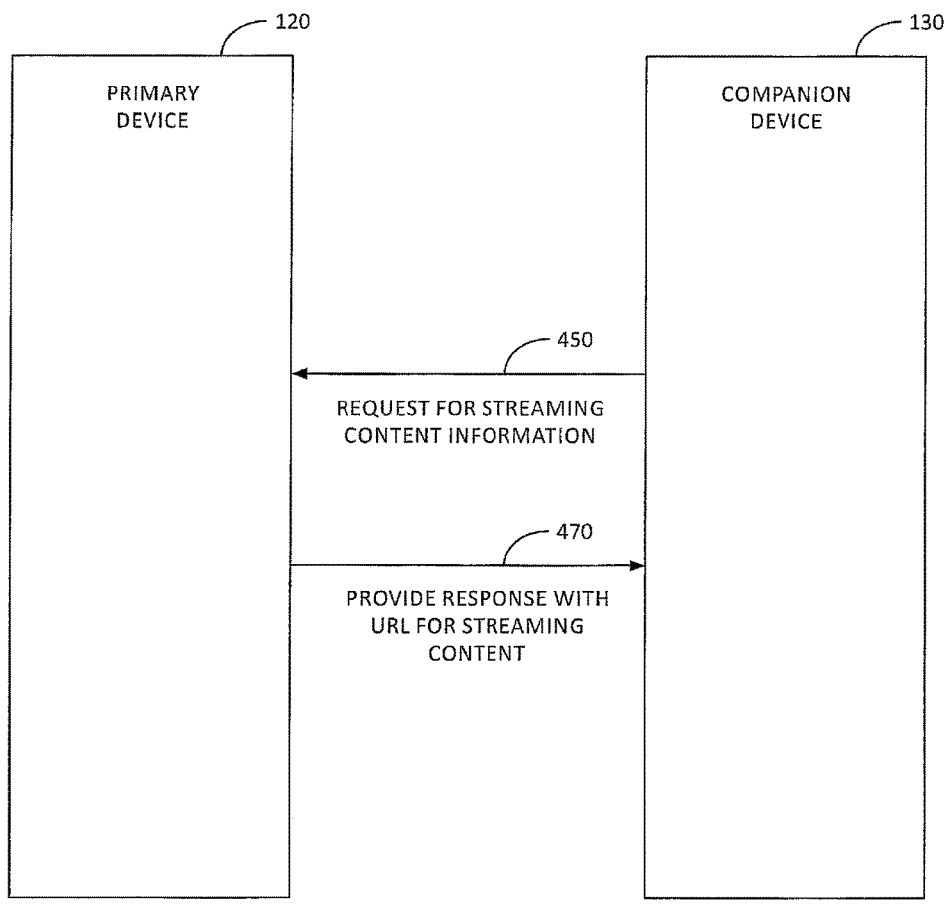
FIG. 8 illustrates another primary device and a companion device system.

Referring to FIG. 8, when the companion device 130 is accessing audiovisual information from the primary device 120 and when the companion device 130 is accessing audiovisual information from another source, such as the Internet or a network location, it is desirable that both sources of such audiovisual information are addressed and obtained in a similar manner. The request for streaming content information 450 from the companion device may result in a description of the streaming content 470, that includes a location identification for the audiovisual content whether the location of the audiovisual information is from the primary device 120 or from another location, such as the Internet or a network. A location may refer to a uniform resource locator or other information that allows locating and/or accessing the audiovisual information.

For example the companion device 130 may make a request to the primary device 120 to receive service information. This may be invoked at any time when needed or otherwise to continuously receive the streaming information. The input parameters may include one or more of the following:
Companion Device ID
Companion Device Application ID
Companion Device Application Version
Current information requested may include one or more of following:
Request for current show information (e.g., electronic service guide information for the current show being presented on the primary device);
Request for currently available components for the current show being presented on the primary device (e.g., video, audio, closed captioning, main camera view, alternative camera view, etc. for the content being presented on the primary device);
Request for currently available files and/or non-real-time content for the current show being presented on the primary device;
Optionally the request may include a filtering criterion which may be used to limit the amount of information being requested in response thereto.
An example of the filtering criterion may be e.g., standard definition video only, high definition video or ultra-high definition video, black/white video, color video, 5.1 channel audio, or stereo audio etc.
For example the primary device 120 may send a response to the companion device 130 after receiving the above request. This may preferably be sent upon receiving a service information request. The response parameters may include one or more of the following:
Primary device ID
Requested information about the current show may include one or more of following:

Current show information (e.g., electronic service guide)

Information about currently available components for the current show with URLs (which include information about protocol, IP address, port, etc.) for accessing the streaming data for each component (e.g., video, audio, closed captioning, main camera view, alternative camera view)

Currently available files and/or non-real-time content for the current show

Figure 9:
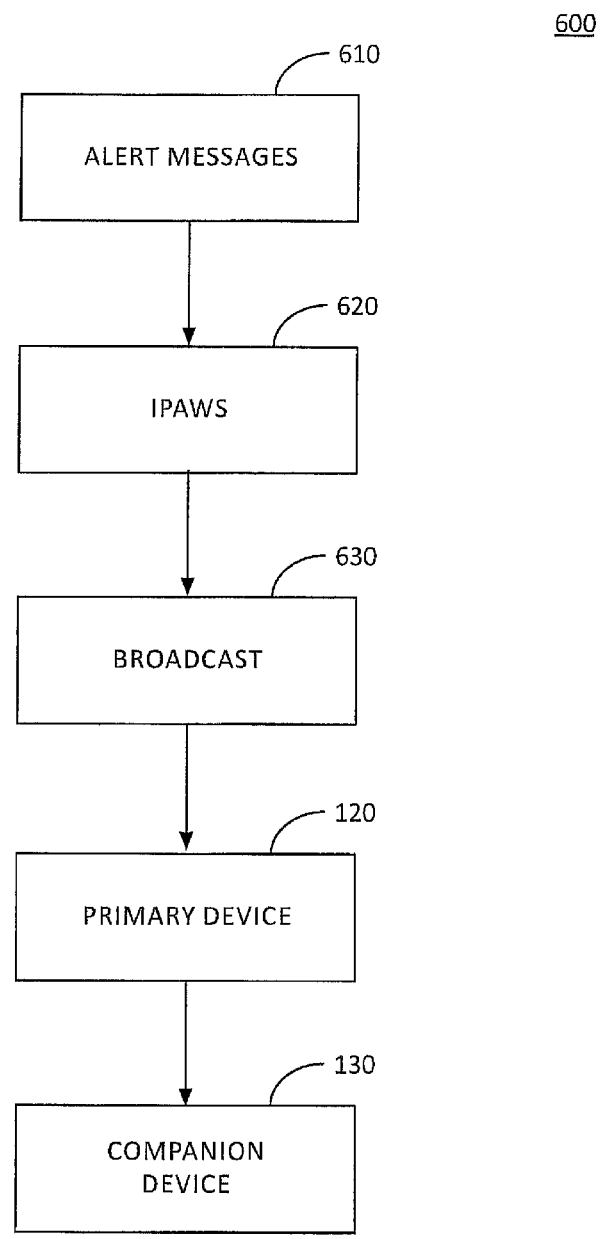
FIG. 9 illustrates an emergency alert system.

Referring to FIG. 9, an emergency alert system 600 may include alert message files 610 formatted in a common alerting protocol and further constrained by a profile of an integrated public alert and warning system (IPAWS) 620. These formatted and constrained alert message files may be issued by a suitable party, such as a federal or state agency. The alert message is broadcast by a broadcaster 630. The primary device 120 may receive these alert messages and selectively provide them to one or more of the companion devices 130.

Figure 10:
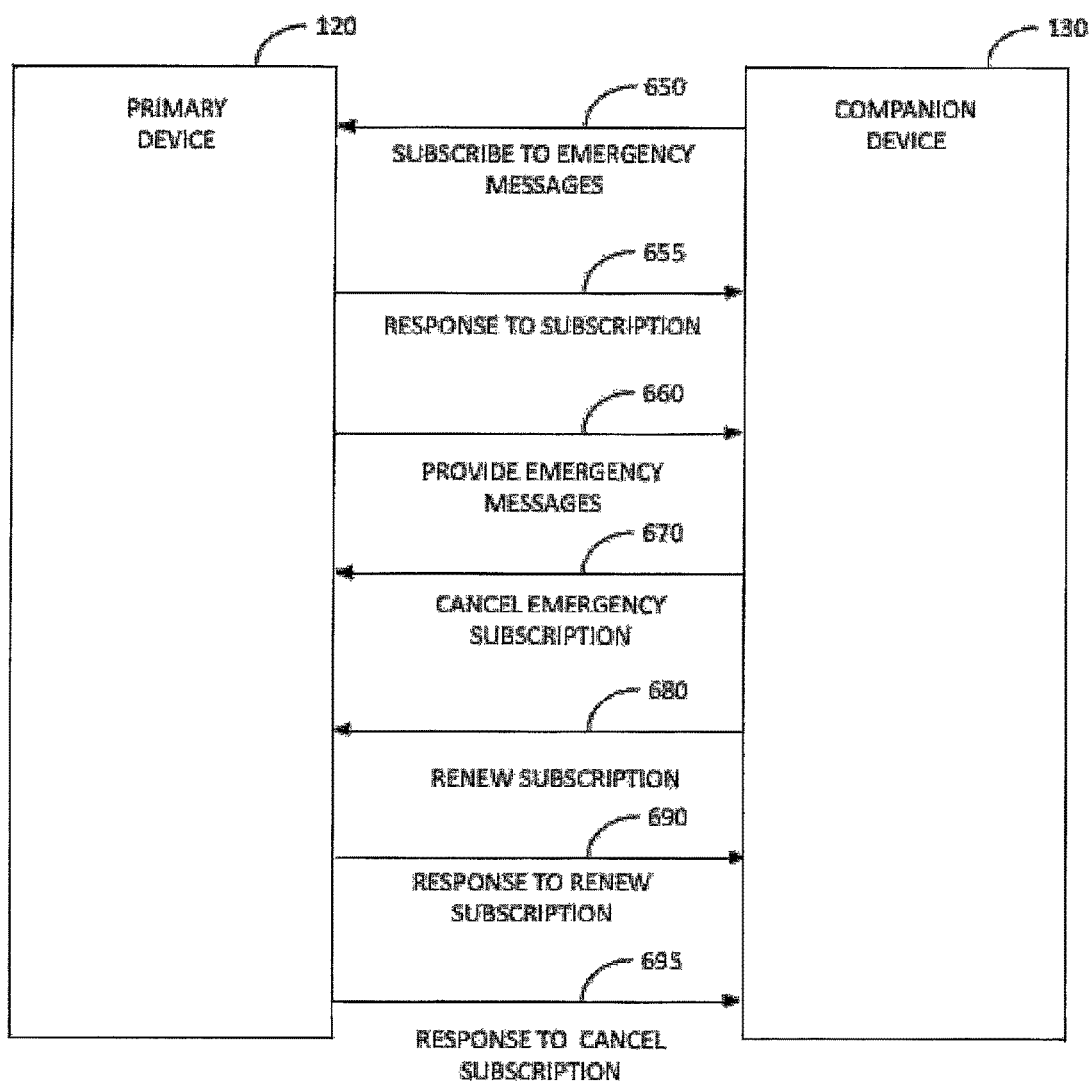
FIG. 10 illustrates another primary device and a companion device system.

Referring to FIG. 10, the companion device 130 subscribes to emergency messages 650 from the primary device 120. The subscription request preferably includes a callback URL. The primary device accepts the subscription and sends a subscription accepted response to the companion device 655 including a subscription ID. When an emergency message is received by the primary device 120, an emergency message is provided 660 to the companion device 130 that has subscribed to the emergency messages using the callback URL previously provided with the subscription. The message 660 may be provided as a notification message.

The companion device 130 may make the subscription to emergency messages when the companion device 130 joins the network or when an emergency message application is started on the companion device 130. The input parameters may include one or more of the following:

Companion Device ID
Companion Device Application ID
Companion Device Application Version
Subscription callback URL information
Optional: emergency message filtering criteria (e.g., geographic location filtering to provide emergency messages corresponding to only the specified location).

For example the primary device 120 may provide the emergency message subscription response to the companion device 130. This may be sent preferably upon receiving the subscription information. The subscription response may include one or more of the following:

Primary device ID
Subscription ID
Subscription duration (e.g., so that the emergency messages are not provided indefinitely, but rather for a reasonable duration that may be appropriate, such as 12 hours)

The companion device 130 may send a message to the primary device 120 to cancel the emergency message subscription 670. Based upon the subscription duration, the companion device 130 may send a message to the primary device 120 to subscribe to emergency messages 650 (or otherwise renew a subscription 680). The parameters provided for the renewal of a subscription may include one or more of the following:

Companion Device ID
Companion Device Application ID
Companion Device Application Version
Subscription ID In this case, the primary device already has the callback URL and geographic filtering information, and the renewed subscription is based upon the subscription ID.

Figure 10A:
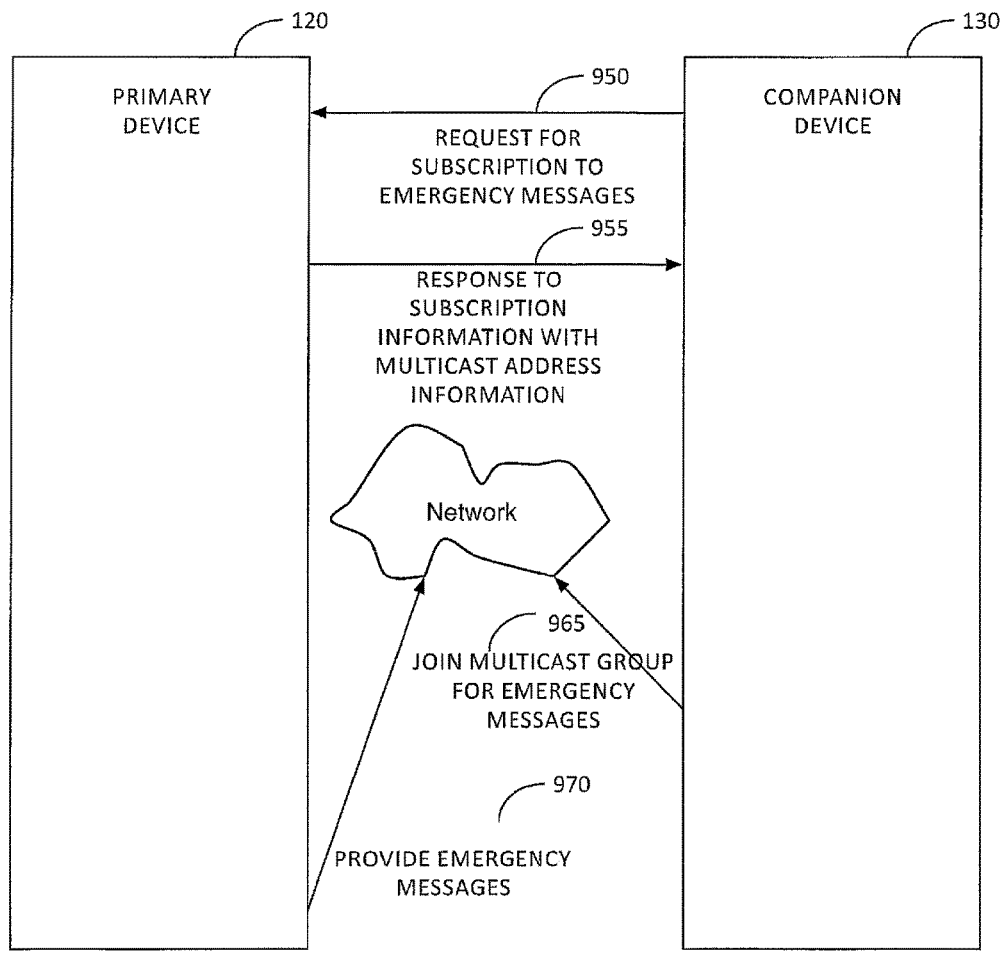
FIG. 10A illustrates another primary device and a companion device system.

When the primary device 120 receives a subscription renewal request 680 it may provide a subscription renewal response 690 to the companion device 130, if desired. The response may include one or more of the following:

Principal Device ID
Subscription ID,
Subscription Duration for subscription renewal request
Success/Failure for subscription stop request When the primary device 120 receives a subscription cancel request 670 it may provide a subscription cancel response 695 to the companion device 130, if desired. The response may include one or more of the following:

Principal Device ID
Subscription ID,
Success/Failure for subscription cancel request Referring to FIG. 10A, the companion device 130 requests information about subscription for emergency messages 950 from the primary device 120. The primary device accepts the request and sends a subscription information response to the companion device 955 including a multicast address information where the emergency alert messages are sent. The multicast address information may include one or more of the following information:

Multicast group address
Multicast port
Protocol information
Additional multicast related information for emergency messages The companion device 130 may join 965 the multicast group for emergency alert messages using the multicast address information. The input parameters when joining the multicast group may include one or more of the following:

Companion Device ID
Companion Device Application ID
Companion Device Application Version
Optional: emergency message filtering criteria (e.g., geographic location filtering to provide emergency messages corresponding to only the specified location).

When an emergency message is received by the primary device 120, the emergency message is notified 970 on the multicast group for emergency alert messages.

The emergency alert message 970 may include one or more of the following:

Primary Device ID
Basic/initial contents of emergency alert message, which may include a collection of minimum required information for the emergency alert messages—such as text information).
Pointer (e.g. location information/URL) for additional information about the emergency alert message The companion device 130 that has joined the multicast group for emergency alert messages may receive the emergency alert messages from the multicast group. The message 970 may be provided as a notification message.

Figure 11:
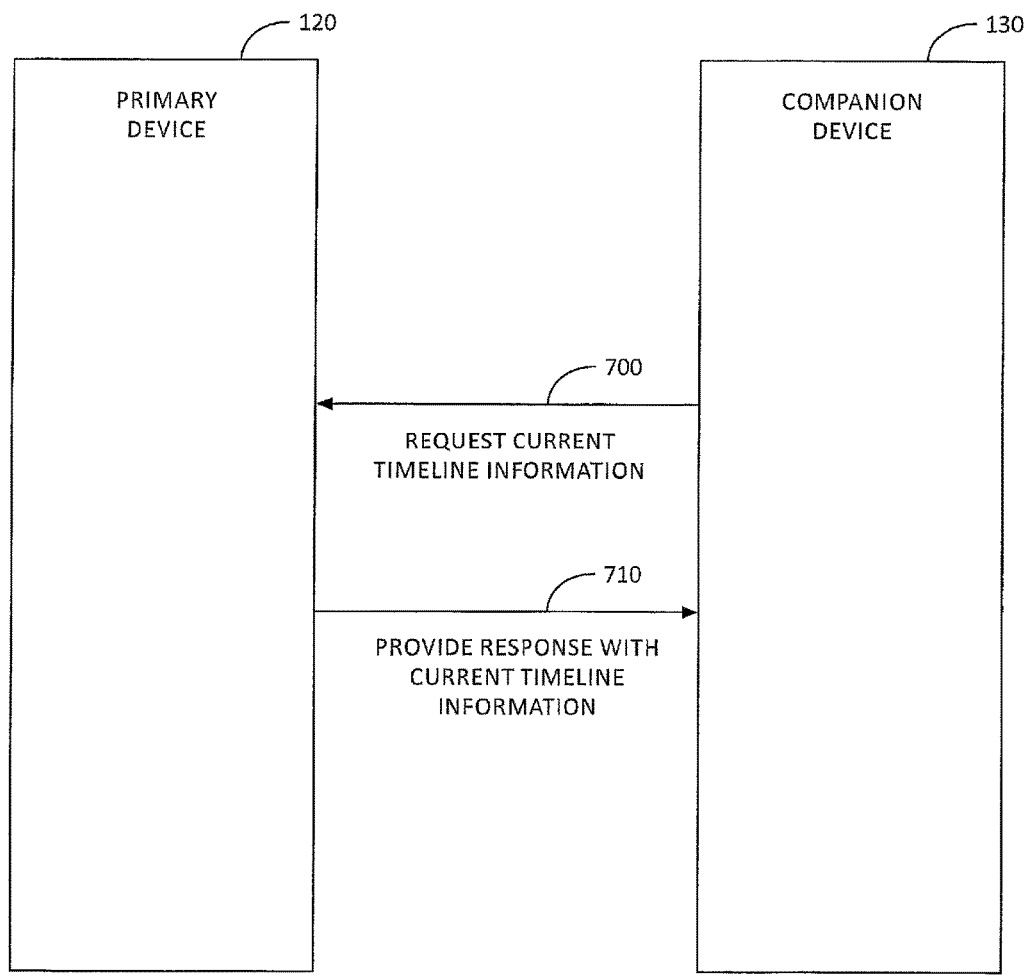
FIG. 11 illustrates another primary device and a companion device system.

Referring to FIG. 11, in some embodiments it is desirable to include a single transaction request response technique to receive timeline location information by the companion device 130 from the primary device 120. This facilitates the synchronization of the audiovisual content being displayed on the primary device 120 and the companion device 130.

For example the companion device 130 may make a request to the primary device 120 to receive the current timeline information 700. This may be invoked at any time when needed by the application. The input parameters may include one or more of the following:

Companion Device ID
Companion Device Application ID
Companion Device Application Version The URL and/or the ID for which the current timeline information is requested or current show being viewed. In one embodiment of the invention, the ID may be a unique identifier that identifies a timeline. In another embodiment, the ID may be a unique identifier that identifies a program. In another embodiment of the invention, the ID may be a program ID.

For example the primary device 120 may make a response to the companion device 130 with the current timeline information. This may be preferably sent upon receiving the request for the current timeline information. The response parameters may include one or more of the following:

Primary device ID
Current timeline location information for the requested URL and/or program ID.

Figure 12:
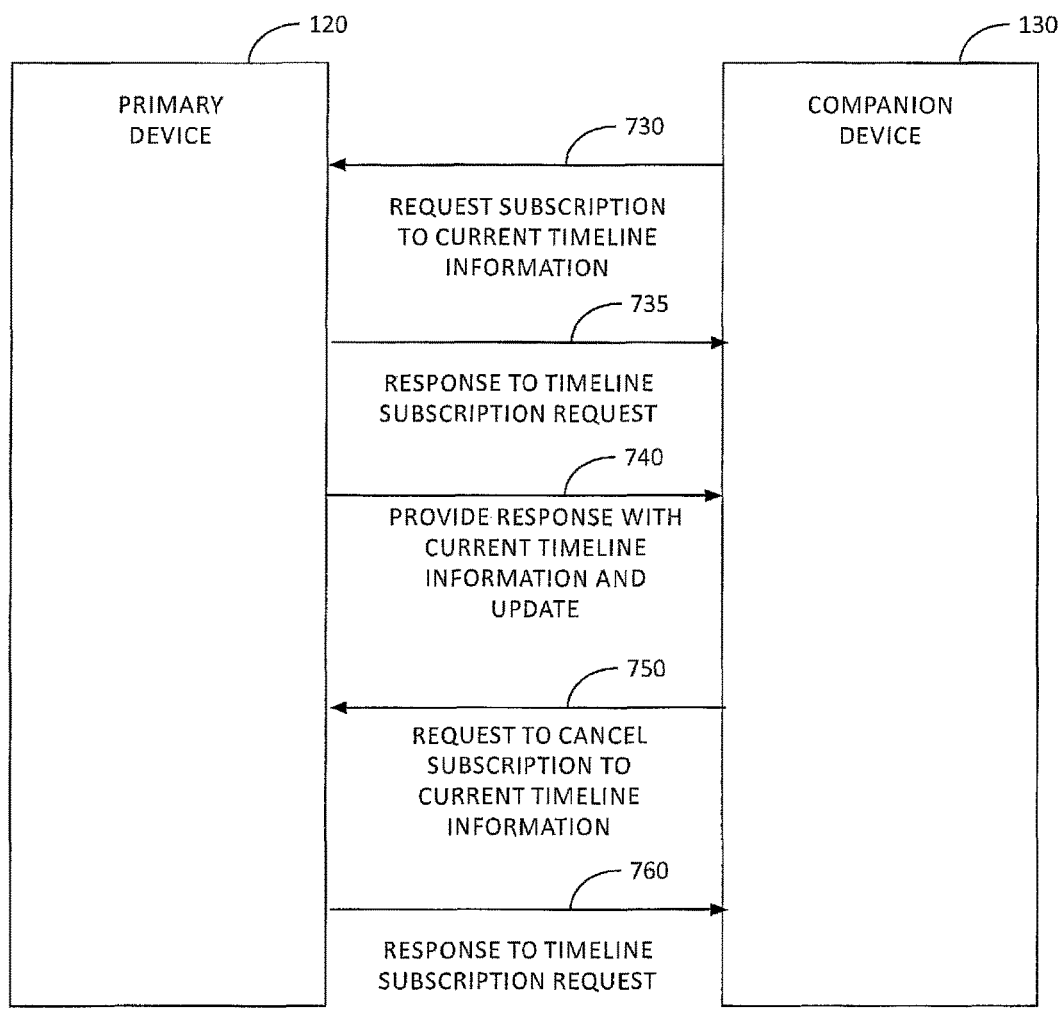
FIG. 12 illustrates another primary device and a companion device system.

Referring to FIG. 12, in some embodiments it is desirable to include a subscription request response technique to receive timeline information by the companion device 130 from the primary device 120. This facilitates the synchronization of the audiovisual content being displayed on the primary device 120 and the companion device 130.

For example the companion device 130 may make a request to the primary device 120 to subscribe to the current timeline information 730. This may be invoked at any time when needed by the application. The input parameters may include one or more of the following:

Companion Device ID
Companion Device Application ID
Companion Device Application Version The URL and/or the program ID for which the current timeline information is requested or current show being viewed Timeline subscription callback URL information The primary device 120 may send a response to the companion device 130 in response to receiving the timeline subscription response 735. The response parameters may include one or more of the following:

Primary device ID
Timeline subscription ID.

The timeline subscription ID may be used to uniquely identify this particular timeline subscription. Thus assigning a timeline subscription ID for each timeline subscription is preferred. This can allow a companion device to request multiple timeline information from primary device at the same time. It can also allow different companion devices to request information about different timelines from different primary devices.

For example the primary device 120 may make a notification to the companion device 130 with the current timeline information that is updated on a regular basis 740. This may be invoked at any time to convey the current timeline information. The response parameters may include one or more of the following:

Primary device ID
Current timeline location information for the requested URL and/or program ID.
URL and/or program ID The companion device 130 may cease receiving the subscription timeline information after a predetermined period of time and/or sending a request to cancel the subscription 750 to the primary device 120. The request 750 may include the subscription ID to uniquely identify the timeline subscription being cancelled. The primary device may send a response 760 upon receiving a request to cancel the subscription indicating success or failure.

A request response similar to 750 and 760 may be exchanged between the primary device and the companion device to renew the timeline subscription. In this case the request may include the timeline subscription Id to uniquely identify the timeline subscription being renewed.

Figure 12A:
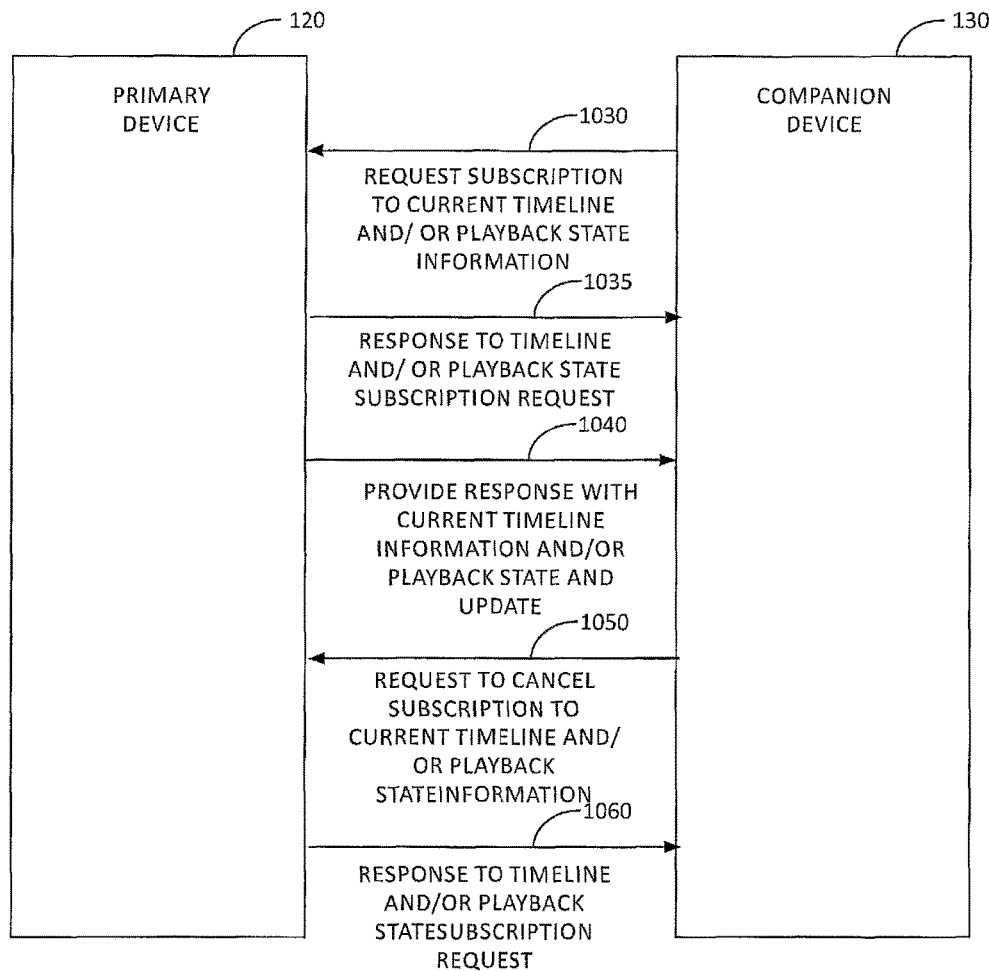
FIG. 12A illustrates another primary device and a companion device system.

Referring to FIG. 12A, in some embodiments it is desirable to include a subscription request response technique to receive timeline and/or media playback state information by the companion device 130 from the primary device 120. This information facilitates the synchronization of the audio-visual content being displayed on the primary device 120 and the companion device 130.

For example the companion device 130 may make a request to the primary device 120 to subscribe to the current timeline and/or current media playback information 1030 on primary device 120. This may be invoked at any time when needed by the application. The input parameters may include one or more of the following:

Companion Device ID
Companion Device Application ID
Companion Device Application Version The URL and/or the program ID for which the current timeline and/or current media playback information is requested or for the current show being viewed Timeline and playback state subscription callback URL information Optional: filter (send only media timeline information/send only media playback state information/send both media timeline and media playback state information)

Optional: Desired frequency at which to receive the notification about media timeline and/or media playback state information The primary device 120 may send a response to the companion device 130 in response to receiving the timeline and/or media playback state subscription response 1035. The response parameters may include one or more of the following:

Primary device ID
Timeline and/or playback state subscription ID
Subscription duration The Timeline and/or playback state subscription ID may be used to uniquely identify this particular subscription. Thus assigning a timeline and/or playback state subscription ID for each timeline and/or playback state subscription is preferred. This can allow a companion device to request multiple timeline and playback state information from primary device at the same time. It can also allow different companion devices to request information about different timelines and playback states from different primary devices.

For example the primary device 120 may make a notification to the companion device 130 with the current timeline and/or media playback state information that is updated on a regular basis 1040. This may be invoked at any time to convey the current timeline and/or media playback state information. The response parameters may include one or more of the following:

Primary device ID
Subscription ID
Current timeline location information for the requested Subscription ID.
Current media playback state information for the Subscription ID. This media playback state may include, for example, playing, paused, stopped, fast forward, speed of fast forward, fast backward, speed of fast backward, and buffering.

The companion device 130 may cease receiving the subscription timeline and/or media playback state information after a predetermined period of time and/or by sending a request to cancel the subscription 1050 to the primary device 120. The primary device may send a response 1060 upon receiving a request to cancel the subscription indicating success or failure.

A request response similar to 1050 and 1060 may be exchanged between the primary device and the companion device to renew the timeline and/or media playback state subscription. In this case the request may include the timeline and/or media playback state subscription ID to uniquely identify the timeline and/or media playback state subscription being renewed.

Figure 12B:
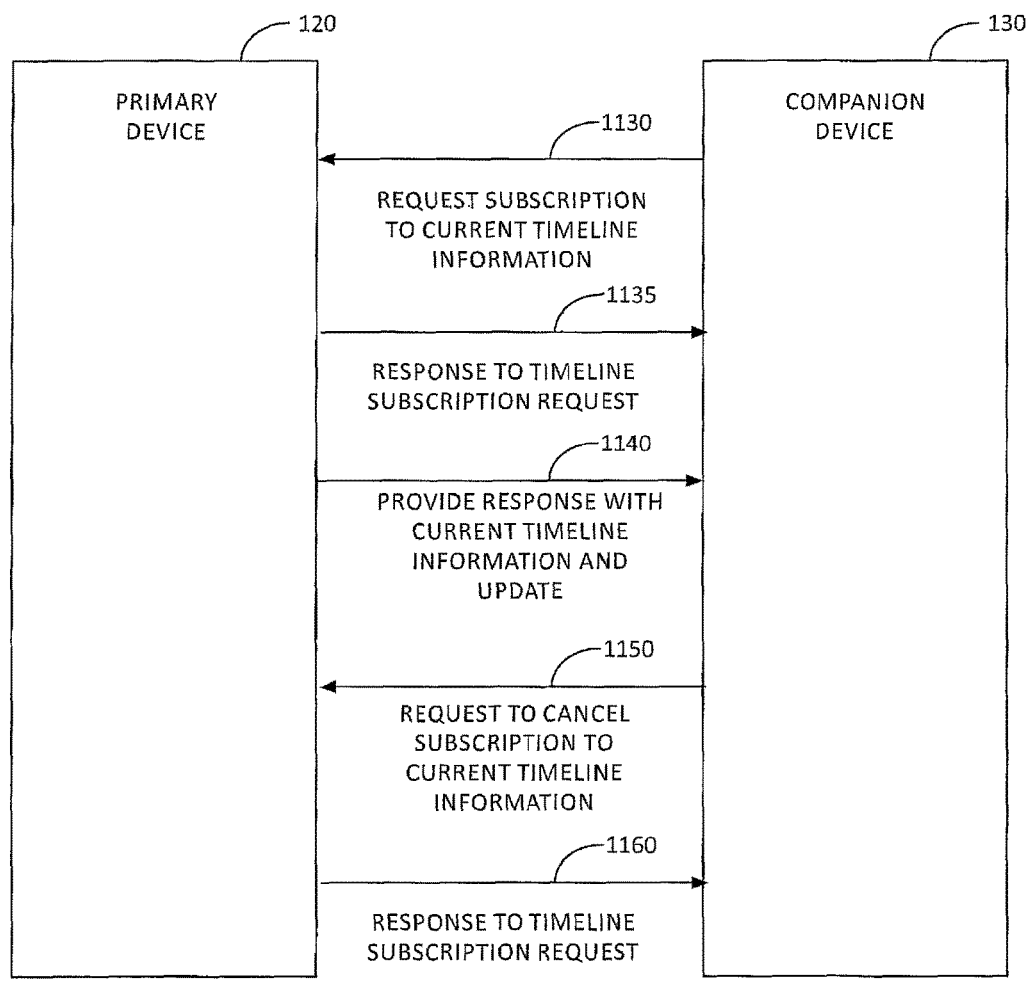
FIG. 12B illustrates another primary device and a companion device system.

Referring to FIG. 12B, in some embodiments it is desirable to include a subscription request response technique to receive timeline information by the companion device 130 from the primary device 120. This facilitates the synchronization of the audiovisual content being displayed on the primary device 120 and the companion device 130.

For example the companion device 130 may make a request to the primary device 120 to subscribe to the current timeline information 1130. This may be invoked at any time when needed by the application. The input parameters may include one or more of the following:

Companion Device ID
Companion Device Application ID
Companion Device Application Version
The URL and/or the program ID for which the current timeline information is requested or for the current show being viewed
Timeline subscription callback URL information The primary device 120 may send a response to the companion device 130 in response to receiving the timeline subscription response 1135. The response parameters may include one or more of the following:

Primary device ID
Timeline subscription ID.

The timeline subscription ID may be used to uniquely identify this particular timeline subscription. Thus assigning a timeline subscription ID for each timeline subscription is preferred. This can allow a companion device to request multiple timeline information from primary device at the same time. It can also allow different companion devices to request information about different timelines from different primary devices.

For example the primary device 120 may make a notification to the companion device 130 with the current timeline information that is updated on a regular basis 1140. Thus the current timeline information may be sent periodically. Additionally the timeline information may be sent from primary device 120 to companion device 130 whenever the timeline on the primary device changes nonlinearly. This non-linear timeline change based notification is described later with respect to FIG. 12C and FIG. 12D. This may be invoked at any time to convey the current timeline information. The response parameters may include one or more of the following:

Primary device ID
Current timeline location information for the requested URL and/or program ID
URL and/or program ID The companion device 130 may cease receiving the subscription timeline information after a predetermined period of time and/or by sending a request to cancel the subscription 1150 to the primary device 120. The request 1150 may include the subscription ID to uniquely identify the timeline subscription being cancelled. The primary device may send a response 1160 upon receiving a request to cancel the subscription indicating success or failure.

A similar request response 1150 and 1160 may be exchanged between the primary device and the companion device to renew the timeline subscription. In this case the request may include the timeline subscription ID to uniquely identify the timeline subscription being renewed.

Figure 12C:
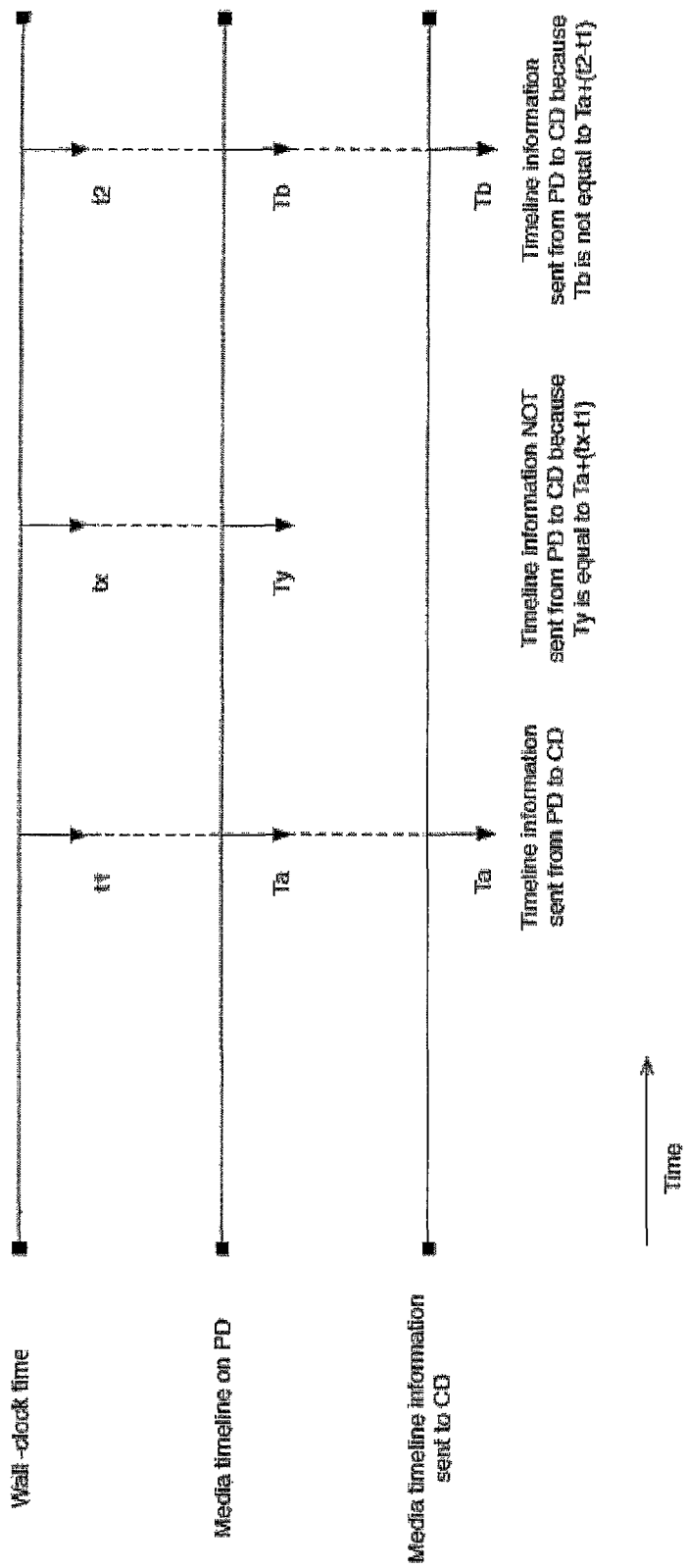
FIG. 12C illustrates a non-linear timeline change based event notification.
Figure 12D:
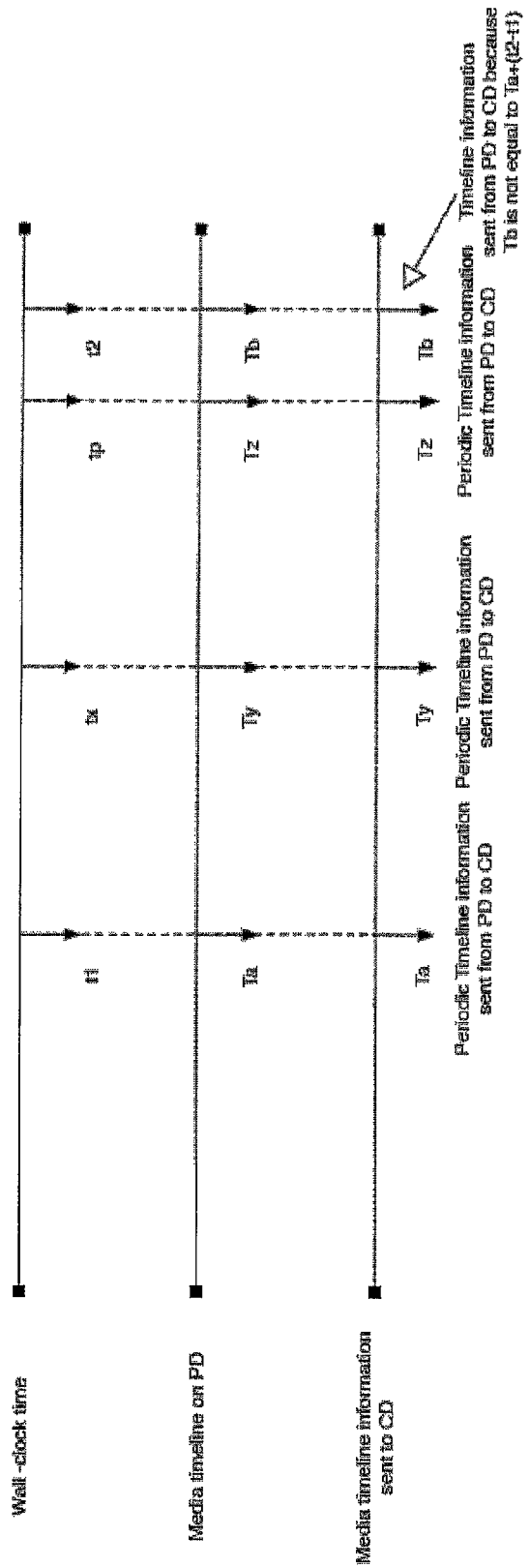
FIG. 12D illustrates another non-linear timeline change based event notification.

The non-linear timeline change based notification is described with respect to FIG. 12C and FIG. 12D. A non-linear timeline change may be detected when during certain wall-clock time period the media timeline changes by a duration different than the wall-clock time duration. As an example if timeline information was communicated by primary device (PD) to companion device (CD) at wall-clock time t1 when the media timeline communicated was Ta, then at a subsequent wall-clock time t2 (with t2 greater than or equal to t1) if the media timeline information Tb is such that Tb is not equal to (or approximately) equal to Ta+(t2−t1) or is not equal to Ta−(t2−t1) or is not equal to Ta+x*(t2−t1) where x is a real number then the media timeline information Tb may be communicated from PD to CD at wall-clock time t2. These scenarios are illustrated further in FIG. 12C and FIG. 12D.

Referring to FIG. 12C, in an example, after sending the media timeline information Ta to CD for the first time, the PD does not send media timeline information to CD unless non-linear timeline change happens. Thus at wall-clock time tx, when the media timeline information on PD is equal to Ty, since Ty is equal to Ta+(tx−t1), the media timeline information Ty is not sent from PD to CD. This is because, in this case, the value Tb can be automatically derived from a clock running on the CD. At wall-clock time t2, when the media timeline information on PD is equal to Tb, since Tb is not equal to Ta+(t2−t1), the media timeline information Tb is sent from PD to CD.

Referring to FIG. 12D in addition to sending the non-linear timeline change event information from PD to CD; the timeline information is also sent periodically from PD to CD. Thus periodically at wall-clock time t1, tx, tp respectively the media timeline information Ta, Ty, Tz respectively is sent from PD to CD. At wall-clock time t2, when the media timeline information on PD is equal to Tb, since Tb is not equal to Ta+(t2−t1), the media timeline information Tb is sent from PD to CD. It should be also noted that Tb is not equal to Tz+(t2−tp) and Tb is also not equal to Ty+(t2−tx).

In one particular embodiment of the non-linear timeline change event, the timeline information is communicated from PD to CD when a program/show completes playback on PD and a new program/show playback starts. Another example is when a service or channel change occurs on PD.

Figure 13:
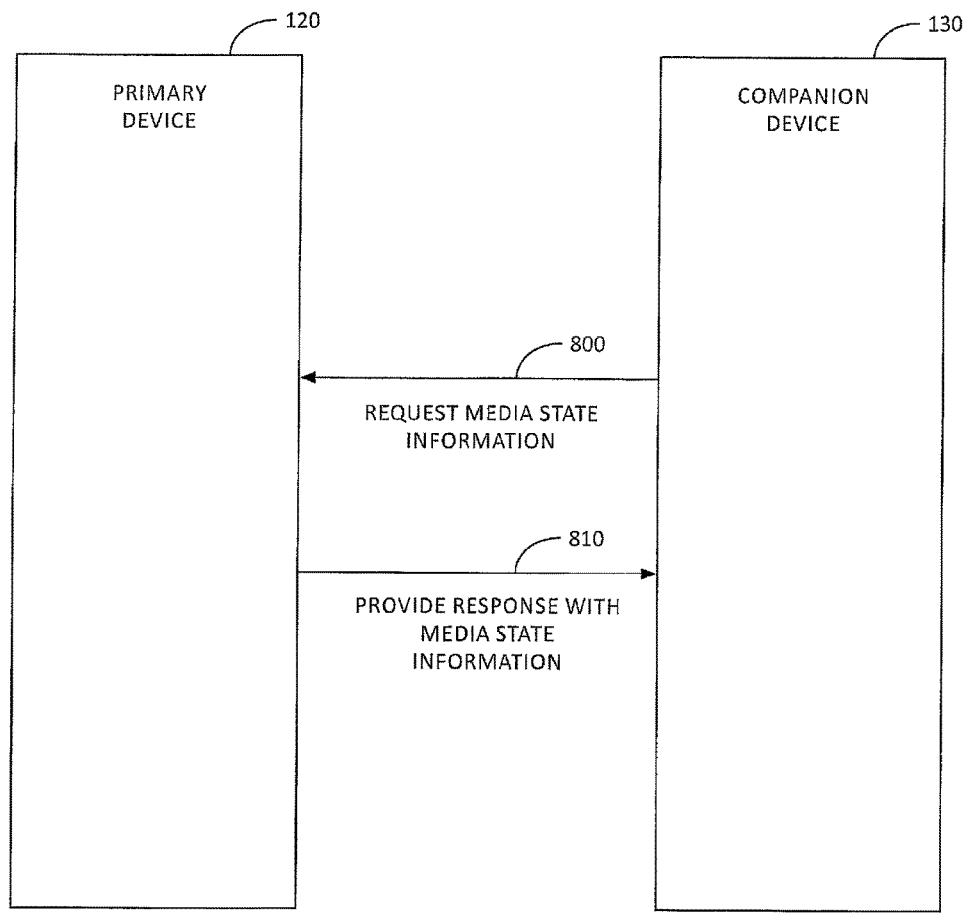
FIG. 13 illustrates another primary device and a companion device system.

Referring to FIG. 13, in some embodiments it is desirable to convey the media playback state of the media (service/program/show/segment) being played back on the primary device 120 to the companion device 130. This information is especially useful for the companion device 130 if it desires to stay in synchronization with the primary device 120. This facilitates the synchronization of the audiovisual content being displayed on the primary device 120 and the companion device 130.

For example the companion device 130 may make a request to the primary device 120 to receive the media state information 800. This may be invoked at any time when needed by the application. The input parameters may include one or more of the following:
  Companion Device ID
  Companion Device Application ID
  Companion Device Application Version
  The URL and/or the ID for which the media playback state is requested.

For example the primary device 120 may make a response to the companion device 130 with the media state information 810. This may be preferably sent upon receiving the request for the media state information. The response parameters may include one or more of the following:
  Primary device ID
  Current media playback state information for the requested URL/ID. This current media playback state may include, for example, playing, paused, stopped, fast forward, speed of fast forward, fast backward, speed of fast backward, and buffering.

Figure 14:
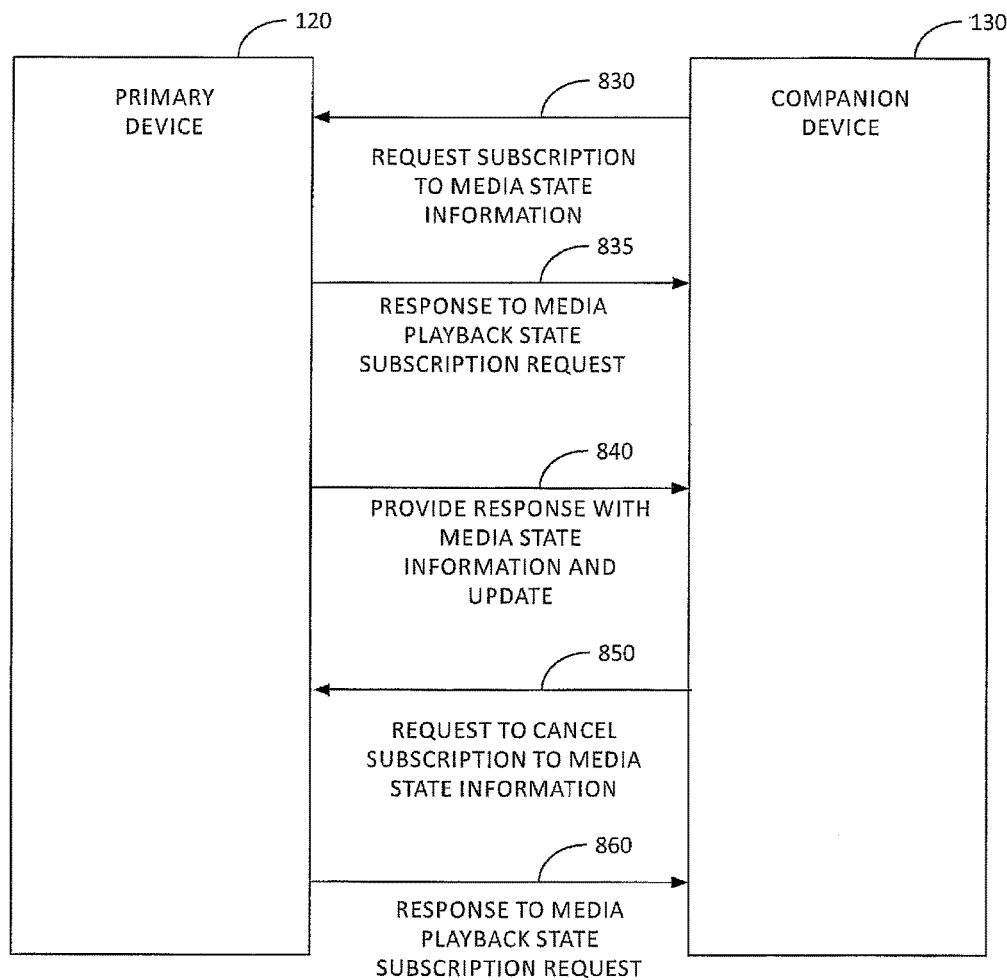
FIG. 14 illustrates another primary device and a companion device system.

Referring to FIG. 14, in some embodiments it is desirable to include a subscription request response technique to receive the media state information by the companion device 130 from the primary device 120. This facilitates the synchronization of the audiovisual content being displayed on the primary device 120 and the companion device 130.

For example the companion device 130 may make a request to the primary device 120 to subscribe to the media playback state information 830. This may be invoked at any time when needed by the application. The input parameters may include one or more of the following:
  Companion Device ID
  Companion Device Application ID
  Companion Device Application Version
  The URL and/or the ID for which the media playback state is requested
  Media state subscription callback URL information The primary device 120 may send a response to the companion device 130 in response to receiving the media playback state subscription response. The response parameters may include one or more of the following:
  Primary device ID
  Media playback state subscription ID.

The media playback state subscription ID may be used to uniquely identify this particular media playback state subscription. Thus assigning a media playback state subscription ID for each media playback state subscription is preferred. This can allow a companion device to request multiple media playback state information from the primary device at the same time. It can also allow different companion devices to request information about different media playback states from different primary devices.

For example the primary device 120 may send a notification to the companion device 130 with the current media playback state information that is updated on a regular basis 840. This may be invoked at any time to convey the media playback state information. In one embodiment the notification may be sent every time the media playback state changes. For example if the viewer pauses the presentation on the primary device. Then a media playback state notification indicating the "Paused" state will be sent from the primary device to the secondary device. Then later when the viewer resumes play on the primary device a media playback state notification indicating the "Playing" state will be sent from the primary device to the secondary device. This can allow the companion device to playback media synchronized with the primary device. For example in one embodiment companion device may automatically change its own media playback state when it receives a notification message indicating the change in the media playback state of the primary device. Thus the response parameters may include one or more of the following:
  Primary device ID
  Media state subscription ID information for the requested URL and/or program ID
  Current media playback state information for the subscription ID. This may include, for example, playing, paused, stopped, fast forward, speed of fast forward, fast backward, speed of fast backward, and buffering.

The companion device 130 may cease receiving the media state subscription information after a predetermined period of time and/or sending a request to cancel the subscription 850 to the primary device 120. The primary device may send a response 860 upon receiving a request to cancel the subscription indicating success or failure.

A similar request response as 850 and 860 may be exchanged between the primary device and the companion device to renew the media playback state subscription. In this case the request preferably includes the media playback state subscription ID to uniquely identify the media playback state subscription being renewed.

In some embodiments, there may be multiple audiovisual content being displayed each having their own timeline, which is managed by the companion device. In this manner, the companion device can simultaneously display more than one audiovisual content and/or switch between different audiovisual content, while being in synchronization with the corresponding primary device. In addition, by subscribing to the media playback state information, the primary device 120 may notify the media playback state to the companion device 130 when events occur, such as for example, stopping the audiovisual content, pausing the audiovisual content, fast forwarding the audiovisual content, rewinding the audiovisual content, skipping forward and/or backward in the audiovisual content, or otherwise.

As previously described for example in relation with FIG. 5 and FIG. 6, the companion device 130 may be made discoverable from the primary device 120. Thus the primary device may discover a companion device.

Referring FIG. 6, for example the companion device 130 may advertise or announce a message to help its discovery by the primary device 120. This may be invoked at any time when needed by the application, such as starting the application and/or joining the network using a multicast message, or when the primary device sends a multicast search request for device type/service types of the companion device (or for example when receiving a unicast message from companion device). The input parameters may include one or more of the following:
  Companion Device ID
  Companion Device Application ID
  Companion Device Application Version
  Human readable name of companion device
  Companion device services (service types) supported Referring FIG. 5, for example the primary device 120 may send a multicast message to the network to discover the companion device 130. Thus the primary device may send a multicast search message looking for device type/service type of companion device(s). The search message parameters may include one or more of the following:
  Primary device ID
  Primary Device type
  Primary Device version
  Human readable name of primary device
  Companion device type and/or companion device service type being looked up It is to be understood that the system may be reconfigured, as desired. It is to be understood that the system may include additional elements and/or fewer elements, as desired. It is to be understood that some of the message sequence may be altered such that a message 1 shown to be sent before message 2 may instead be sent after message 2.

It is to be understood that the claims are not limited to the precise configuration and components illustrated above. Various modifications, changes and variations may be made in the arrangement, operation and details of the systems, methods, and apparatus described herein without departing from the scope of the claims.

It is to be understood that the system may communicate one or more messages from one device to another using a network. It is to be understood that the system may communicate one or more messages from one device to another device not using a network. Any other manner of communicating messages between one or more devices may be used, as desired.

It is to be understood that the system may communicate one or more messages from one device to another using any type of messaging protocol and/or technique, such as for example, unicast and/or multicast.

It is to be understood that the primary device may include a single device or may be comprised of a plurality of devices (physical and/or virtual). It is to be understood that the companion device may include a single device or may be comprised of a plurality of devices (physical and/or virtual).

It is to be understood that the term ATSC identifies a broadcast system and include systems defined by the Advanced Television Systems Committee, Digital Video Broadcasting (DVB), Association of Radio Industries and Businesses (ARIB), and other public and private systems.

The invention claimed is:

1. A method for a companion device to receive current service information from a primary device comprising:
    (a) said companion device requesting said current service information from said primary device;
    (b) said requesting by said companion device comprising input parameters including:
        (i) a companion device ID;
        (ii) a companion device application ID; and
        (iii) a companion device application version;
    (c) said requesting by said companion device comprising current information requested including:
        (i) a request for current available non real-time audiovisual content for a current show; and
        (ii) a request for timeline location information within said current show;
    (d) said companion device receiving from said primary device in response to said requesting said current service information a current service information response;
    (e) said receiving said current service information response including:
        (i) a primary device ID;
        (ii) said current available non real-time audiovisual content for said current show; and
        (iii) said timeline location information within said current show.

2. A companion device that receives current service information from a primary device comprising:
    (a) said companion device requesting said current service information from said primary device;
        (i) input parameters including:
            (a) a companion device ID;
            (b) a companion device application ID; and
            (c) a companion device application version;
        (ii) current information requested including a request for current available non real-time audiovisual content for a current show; and
        (iii) a request for timeline location information within said current show;
    (b) said companion device receiving from said primary device in response to said requesting said current service information a current service information response;
        (i) a primary device ID;
        (ii) said current available non real-time audiovisual content for said current show; and
        (iii) said timeline location information within said current show.

3. A primary device to provide current service information to a companion device comprising:
    (a) said primary device providing said current service information to said companion device in response to a request from said companion device comprising;
        (i) input parameters including:
            (a) a companion device ID;
            (b) a companion device application ID; and
            (c) a companion device application version;
        (ii) current information requested including:
            (a) a request for current available non real-time audiovisual content for a current show; and
            (b) a request for timeline location information within said current show;
    (b) said primary device providing a current service information response to said companion device in response to said request of said current service information including:
        (i) a primary device ID;
        (ii) said current available non real-time audiovisual content for said current show; and
        (iii) said timeline location information within said current show.

4. The primary device of claim 3 wherein the request from said companion device includes said companion device ID.

5. The primary device of claim 3 wherein the request from said companion device includes said companion device application ID.

6. The primary device of claim 3 wherein the request from said companion device includes said companion device application version.

7. The primary device of claim 3 wherein the request from said companion device includes said companion device ID, said companion device application ID, and said companion device application version.

8. The primary device of claim 3 wherein said current information requested includes a request electronic service guide information for said current show.

9. The primary device of claim 3 wherein said current information requested includes a request for current available components for said current show.

10. The primary device of claim 3 wherein said current information requested includes a request for current available files for said current show.

11. The primary device of claim 3 wherein said current information requested includes a request electronic service guide information for said current show, a request for current available components for said current show, a request for current available files for said current show, and said request for current available non real-time audiovisual content for said current show.

12. The primary device of claim 3 wherein said providing said current service information response includes providing electronic service guide information for said current show.

13. The primary device of claim 3 wherein said providing said current service information response includes providing current available components for said current show.

14. The primary device of claim 3 wherein said providing said current service information response includes providing current available files for said current show.

15. The primary device of claim 3 wherein said providing said current service information response includes providing electronic service guide information for said current show, current available components for said current show, current available files for said current show, and said current available non real-time audiovisual content for said current show.

* * * * *